(12) United States Patent
Cimberio et al.

(10) Patent No.: US 12,169,075 B2
(45) Date of Patent: Dec. 17, 2024

(54) PROCESS AND APPARATUS FOR MONITORING AND/OR CONTROLLING AN AIR CONDITIONING AND/OR HEATING PLANT

(71) Applicant: FIMCIM S.p.A., Milan (IT)

(72) Inventors: Roberto Cimberio, Ameno Fraz. Vacciago (IT); Tiziano Guidetti, Borgomanero (IT); Antoine Frein, Milan (IT)

(73) Assignee: CIMBERIO HOLDING S.R.L., Milan (IT)

(*) Notice: Subject to any disclaimer, the term of this patent is extended or adjusted under 35 U.S.C. 154(b) by 382 days.

(21) Appl. No.: 17/630,131

(22) PCT Filed: Jul. 14, 2020

(86) PCT No.: PCT/IB2020/056608
§ 371 (c)(1),
(2) Date: Jan. 25, 2022

(87) PCT Pub. No.: WO2021/014273
PCT Pub. Date: Jan. 28, 2021

(65) Prior Publication Data
US 2022/0268476 A1    Aug. 25, 2022

(30) Foreign Application Priority Data
Jul. 25, 2019  (IT) .......................... 102019000012927

(51) Int. Cl.
*F24F 11/84* (2018.01)
*F24F 11/63* (2018.01)
*G05B 19/042* (2006.01)

(52) U.S. Cl.
CPC .............. *F24F 11/84* (2018.01); *F24F 11/63* (2018.01); *G05B 19/042* (2013.01); *G05B 2219/2614* (2013.01)

(58) Field of Classification Search
CPC ........ F28F 9/26; F28F 9/0253; F28F 2250/08; F24F 11/30; F24F 11/84; F24F 11/83;
(Continued)

(56) References Cited

U.S. PATENT DOCUMENTS

| 10,635,120 B2 | 4/2020 | D'Silva et al. |
| 2017/0067656 A1* | 3/2017 | Guidetti ................... F24F 11/84 |

(Continued)

FOREIGN PATENT DOCUMENTS

| EP | 2 910 861 | 8/2015 |
| EP | 3 141 822 | 3/2017 |

(Continued)

OTHER PUBLICATIONS

HVAC system optimization for energy management by evolutionary programming, K.F. Fong , V.I. Hanby , T.T. Chow (Year: 2012).*
(Continued)

*Primary Examiner* — Darrin D Dunn
(74) *Attorney, Agent, or Firm* — Nixon & Vanderhye P.C.

(57) ABSTRACT

A process and apparatus for monitoring and/or controlling at least one air conditioning and/or heating plant (1) including a delivery line (3), a return line (4) and service lines (5) hydraulically interposed between the delivery line (3) and the return line (4), each service line (5) comprising at least one thermal exchange unit (7). The process detects a value (φ) of the flow rate of the carrier fluid traversing the thermal exchange unit (7), and determines a temperature difference (ΔT) between the temperature (Tt1) of the carrier fluid, at the first section (5a), detected at a first instant (t1), and the temperature (Tt2) of the carrier fluid, at the second section
(Continued)

(5b), detected at a second instant (t2). The process determines a characteristic function which relates said temperature difference ($\Delta T$) between the first and the second section to the carrier fluid flow rate ($\varphi$).

22 Claims, 8 Drawing Sheets

(58) Field of Classification Search
CPC .... F24F 11/85; F24F 11/62; F24F 3/06; F24F 11/63; F24F 2110/10; F24F 2140/20; F24F 11/65; F24F 13/00; F24F 2140/00; F24F 11/70; G05B 13/042; G05B 19/042; G05B 2219/2614
See application file for complete search history.

(56) References Cited

U.S. PATENT DOCUMENTS

| | | | |
|---|---|---|---|
| 2017/0067662 A1* | 3/2017 | Guidetti | F24F 11/30 |
| 2022/0155112 A1* | 5/2022 | Bar | G01F 1/36 |

FOREIGN PATENT DOCUMENTS

| | | |
|---|---|---|
| EP | 3 141 823 | 3/2017 |
| EP | 3 428 547 | 1/2019 |
| WO | 2013/034358 | 3/2013 |
| WO | 2014/183868 | 11/2014 |
| WO | 2019/020429 | 1/2019 |

OTHER PUBLICATIONS

Modelling and performance prediction of an integrated central cooling plant for HVAC energy efficiency improvement Vahid Vakiloroayal ( ), Jafar Madadnia1 , Bijan Samali (Year: 2006).*
International Search Report for PCT/IB2020/056608 dated Oct. 16, 2020, 5 pages.
Written Opinion of the ISA for PCT/IB2020/056608 dated Oct. 16, 2020, 10 pages.

* cited by examiner

PROCESS AND APPARATUS FOR MONITORING AND/OR CONTROLLING AN AIR CONDITIONING AND/OR HEATING PLANT

RELATED APPLICATION

This application is the U.S. national phase of International Application PCT/IB2020/056608, filed Jul. 14, 2020, which designated the U.S. and claims priority to Italian patent application IT 102019000012927, filed Jul. 25, 2019, the entire contents of each of which are hereby incorporated by reference.

FIELD OF THE INVENTION

The invention regards a process of monitoring and/or controlling an air conditioning and/or heating plant, e.g. of HVAC type. In some embodiments, the process and the device according to aspects of the invention can be used for actively controlling or for monitoring parameters such as the fluid flow rate or the temperature of the carrier fluid traversing one or more thermal exchange units constituting an air conditioning and/or heating plant. The invention also regards an air conditioning and/or heating plant using the process and the device according to the invention. The invention is usable both in civil and in industrial fields and advantageously can be exploited for controlling and optimizing the energy level of air conditioning and/or heating plants.

STATE OF THE ART

As is known, heating and/or air conditioning plants are increasingly used for maintaining environments, such as home or office rooms, in desired climate conditions, e.g. temperature and/or humidity conditions.

Such plants are generally supplied by a central unit comprising a heating unit (such as a boiler, a heat pump or other) and/or a cooling unit; the central unit provides to send, in a suitable distribution circuit, a carrier fluid having desired properties in terms of temperature, flow rate and specific heat. In the environment to be climate-controlled, there are then one or more thermal treatment units (e.g. a fan or fan convector) coupled with a portion of the distribution circuit and capable of transferring heat or cold, respectively, from the carrier fluid circulating in the distribution circuit to the environment to be served.

The control and optimization of air conditioning and/or heating plants are rather complex tasks, especially when there are numerous environments served by the same plant, as it happens in plants for offices, hotels, or buildings in which numerous separate environments are present, where the carrier fluid must be transported in the optimal temperature and flow rate conditions so as to ensure an efficient and optimized thermal exchange. It is evident that the efficiency of the energy exchange in each environment and the mode for controlling the main parameters of the carrier fluid affect the efficiency of the plant in its entirety and hence impact the overall management costs. In particular, in the context of a very large plant, it is generally important to suitably manage parameters such as the flow rate and/or the temperature of the carrier fluid, as well as the thermal power exchanged at each exchanger.

Finally, in addition to an intrinsic control complexity given by the multiplicity of environment served by the same plant, it is also very difficult to recognize if the plant is actually working in an optimal manner and hence close to its ideal work conditions, or if on the other hand there are problems tied to a progressive deterioration of the performances or inefficiencies tied for example to an erroneous use of one or more terminals (e.g. partially obstructed or damaged exchangers).

The known technical solutions have often shown to be unsuitable in monitoring the behavior of the plant and in controlling the carrier fluid, actually forcing the plant to operate in non-optimal conditions.

A further problem is given by the identification of suitable models which allow representing the behavior of the plant and hence which allow facilitating the monitoring thereof.

OBJECT OF THE INVENTION

Object of the present invention is therefore to solve at least one of the drawbacks and/or limitations of the preceding solutions.

In particular, one object of the invention is to suitably control an air conditioning plant/heating so as to optimize the energy exchange thereof, preventing or reducing the operating conditions of poor efficiency.

A further object of the invention is to provide a process and a device which allow detecting and modeling the behavior of the plant and hence which allow characterizing various branches of the plant itself, so as to allow an effective monitoring of the plant itself.

In addition, one object of the invention is to provide a control device and process for air conditioning and/or heating plants capable of optimally adjusting one or more parameters of the carrier fluid traversing the exchangers.

In particular, one object of the invention is to provide a control device and process which allow controlling temperature and/or flow rate of the carrier fluid so as to prevent or reduce the load losses and/or the heat losses.

An additional object of the invention is to provide an air conditioning and/or heating plant which allow improving the energy management in a system dedicated to serve a plurality of separate environments.

One or more of the objects described above, which will be clearer in the course of the following description, are substantially reached by a process and/or by a device and/or by a plant according to one or more of the enclosed claims.

SUMMARY

Aspects of the finding are described hereinbelow.

A 1st aspect regards a process of monitoring and/or controlling at least one air conditioning and/or heating plant (1), said plant comprising at least one delivery line (3), at least one return line (4) and a predetermined number of service lines (5) hydraulically interposed between the delivery line (3) and the return line (4), each service line (5) comprising at least one thermal exchange unit (7).

In a 2nd aspect according to the preceding aspect at least one thermal exchange modulator (7a) is associated with the thermal exchange unit (7).

In a 3rd aspect according to any one of the preceding aspects the process provides, for at least one of said service lines (5), the steps of:
  circulating a carrier fluid through at least one service line so that a same carrier fluid traversing a first section of the service line upstream of the thermal exchange unit (7) traverses a second section of the same service line successively placed downstream of the thermal exchange unit (7), with a hydraulic delay (dt) given by a time necessary for the same fluid particle to pass from the first to the second section, repeating, a plurality of times, a cycle in turn comprising the following substeps:
  a) determining at least one value of the temperature difference ($\Delta T$) between:
    the temperature ($T_{t1}$) of the carrier fluid, at the first section, detected at a first instant (t1), and
    the temperature ($T_{t2}$) of the carrier fluid, at the second section, detected at a second instant (t2), which is subsequent to said hydraulic delay (dt) with respect to the first instant (t1),
  b) detecting the value ($\varphi$) of the carrier fluid flow rate traversing the thermal exchange unit (7), obtaining values in each cycle, in particular at least one pair of values, comprising the value of said temperature difference ($\Delta T$) and said corresponding value of the carrier fluid flow rate ($\varphi$).

The value of the carrier fluid flow rate ($\varphi$) traversing the thermal exchange unit (7) is one of
  the carrier fluid flow rate ($\varphi$) detected at the first instant (t1),
  the carrier fluid flow rate ($\varphi$) detected at the second instant (t2),
  the carrier fluid flow rate ($\varphi$) detected at an intermediate instant (tm) between the first and the second instant (t1 and t2), in particular placed at the midpoint of the time interval between the first instant (t1) and the second instant (t2),
  the average value taken by the carrier fluid flow rate ($\varphi$) during the time interval between the first instant (t1) and the second instant (t2), in particular calculated as:

$$\int_{t1}^{t2}(\varphi(t))dt/(t2-t1)$$

or as:

$$(V0)/(t2-t1)$$

with V0 being a/the control volume equal to the volume of carrier fluid contained between said first and said second section.

Preferably, the value of the carrier fluid flow rate ($\varphi$) traversing the thermal exchange unit (7) is one of:
  the carrier fluid flow rate ($\varphi$) detected at the first instant (t1),
  the carrier fluid flow rate ($\varphi$) detected at an intermediate instant (tm) between the first and the second instant (t1 and t2), in particular placed at the midpoint of the time interval between the first instant (t1) and the second instant (t2).

Note that in order to determine the flow rate, a flow rate sensor may be used placed in the service line (5) either upstream both the first and second sections, or downstream both the first and second sections, or between the first and the second section. Note the position of the flow rate sensor is not highly relevant as the flow rate at each time instant is substantially the same along a same service line.

In a 4th aspect according to the preceding aspect the process provides for the further step of:
  using at least one plurality of said values, in particular at least one plurality of pairs of said values, obtained with respective cycles, determining at least one between the following:
    a characteristic function which relates said temperature difference ($\Delta T$) between the first and the second section with said value of the carrier fluid flow rate ($\varphi$),
    a characteristic function which relates a thermal power exchanged (dQ/dt) by the thermal exchange unit with said value of the carrier fluid flow rate ($\varphi$).

In a 5th aspect according to the 3rd or 4th aspect, said process, optionally before executing said cycle, provides for the execution of one of the following steps:
  receiving a value of the hydraulic delay (dt) between said first and said second section of the same service line,
  determining a value of the hydraulic delay (dt) between said first and said second section of the same service line,
  determining the second instant (t2), which is subsequent to said hydraulic delay (dt) with respect to the first instant (t1).

In a 6th aspect according to the 3rd or 4th aspect, said each cycle comprises one of the following substeps:
  receiving a value of the hydraulic delay (dt) between said first and said second section of the same service line, or
  determining a value of the hydraulic delay (dt) between said first and said second section of the same service line, or
  determining the second instant (t2), which is subsequent to said hydraulic delay (dt) with respect to the first instant (t1).

In a 7th aspect according to the 5th or 6th aspect, the substep is provided for determining said hydraulic delay (dt) which comprises:
  determining or receiving a value of a control volume (V0), which is a value representative of the volume of carrier fluid contained between said first and said second section, and
  calculating the hydraulic delay as the time interval starting from the first instant (t1) and necessary so that a volume of carrier fluid equal to the control volume (V0) traverses the first section (5a).

In an 8th aspect according to any one of the preceding three aspects, the substep is provided for determining the second instant (t2), which comprises:
  determining or receiving a value of a control volume (V0), which is a value representative of the volume of carrier fluid contained between said first and said second section, and
  then, having measured—starting from the first instant t1 (e.g. by using the flow rate detector present in each line (5))—the volume of carrier fluid which progressively traverses the first section, the instant (t2) is directly calculated as that instant in which a volume of carrier fluid equal to the control volume (V0) has traversed the first section (5a).

In a 9th aspect according to any one of the preceding two aspects the step of determining the control volume (V0) in turn comprises:
  measuring a temperature of the carrier fluid at the first section and at the second section,
  varying the temperature of the carrier fluid entering said service line,
  identifying an initial instant (ts) in which the temperature of the carrier fluid at the first section varies, optionally beyond a predetermined threshold,
  identifying a final instant (tf) in which the temperature of the carrier fluid at the second section varies, optionally beyond a predetermined threshold,
  measuring values of the carrier fluid flow rate ($\varphi(t)$) during an interval comprised between said initial instant and said final instant, calculating the control volume (V0) on the basis of the values assumed by the carrier fluid flow rate in the interval between said initial instant and said final instant.

In a 10th aspect according to the preceding aspect, calculating the control volume (V0) on the basis of the values assumed by the carrier fluid flow rate in the interval between said initial instant and said final instant provides for using the following formula:

$$\int_{ts}^{tf}(\varphi(t))dt = V0$$

in which:
φ(t) represents the value of the carrier fluid flow rate over time,
ts is the initial instant,
tf is the final instant.

In an 11th aspect according to any one of the preceding aspects, the detection instant (tm)—at which the substep is carried out for detecting the value of the carrier fluid flow rate (φ) traversing the thermal exchange unit (7)—is an intermediate instant (tm).

In a 12th aspect according to the preceding aspect, the intermediate instant (tm) is an instant placed at the midpoint of the time interval between the first instant (t1) and the second instant (t2).

In a 13th aspect according to any one of the preceding aspects the process comprises the step of determining, interpolating the values of the temperature difference and of the carrier fluid flow rate of said plurality of pairs of values, the characteristic function which relates the temperature difference (ΔT) between the first and the second section with the value of the carrier fluid flow rate (φ).

In a 14th aspect according to any one of the preceding aspects the process and in particular said cycle comprises the further substep of determining the thermal power exchanged (dQ/dt) by the thermal exchange unit, on the basis of said value of the carrier fluid flow rate (φ) traversing the thermal exchange unit (7) and of said temperature difference (ΔT), obtaining in each cycle a set of three values comprising:
the value of said temperature difference (ΔT) between the temperature ($T_{t1}$) measured at the first instant (t1) and the temperature ($T_{t2}$) measured at the second instant (t2),
the value of said carrier fluid flow rate (φ) measured at the detection instant (tm), and
the corresponding value of said thermal power exchanged (dQ/dt) by the thermal exchange unit.

In a 15th aspect according to the preceding aspect the process comprises a further step of determining the characteristic function of the thermal exchange unit present in said service line which relates the thermal power exchanged (dQ/dt) with said value of the carrier fluid flow rate (φ), said characteristic function of the thermal exchange unit being determined by using a plurality of said sets of three values obtained at respective cycles.

In a 16th aspect according to the preceding aspect the step of determining the characteristic function of the exchanger is executed by using a plurality of values of the thermal power exchanged (dQ/dt) and of the carrier fluid flow rate (φ) obtained with the respective cycles.

In a 17th aspect according to any one of the preceding aspects the characteristic function of the thermal exchange unit present in said service line, which relates the thermal power exchanged with the value of the carrier fluid flow rate, is an exponential curve of type:

$$\frac{dQ}{dt} = A*\left(1 - e^{-\left(\frac{\varphi}{\varphi_0}\right)}\right)$$

where:
dQ/dt represents the thermal power exchanged by the specific thermal exchange unit,
φ is the flow rate of the carrier fluid entering the thermal exchange unit,
A and $\varphi_0$ are obtained with techniques of curve fitting and/or interpolation, approximating the pairs of values of flow rate of the carrier fluid (φ) and of the thermal power (dQ/dt) obtained with each cycle.

In a 18th aspect according to the preceding aspect said exponential curve is:

$$\frac{dQ}{dt} = \left[a_1 \cdot |T_{t1} - T_{air,t1}|^n + a_2 \cdot \left(1 - \text{Min}\left(1, \frac{T_{air,t1} - T_{db,air,t1}}{T_{air,t1} - T_{t1}}\right)\right)^n\right] \cdot (1 - e^{-(\varphi/\varphi_0)})$$

where:

$$A = \left[a_1 \cdot |T_{t1} - T_{air,t1}|^n + a_2 \cdot \left(1 - \text{Min}\left(1, \frac{T_{air,t1} - T_{db,air,t1}}{T_{air,t1} - T_{t1}}\right)\right)^n\right]$$

where:
dQ/dt represents the thermal power [kW] exchanged by the specific thermal exchange unit,
φ is the flow rate of the carrier fluid [kg/h] entering the thermal exchange unit,
$T_{t1}$: Temperature [° C.] of the carrier fluid entering the thermal exchange unit, i.e. at the first section at the instant t1;
$T_{air,t1}$: Temperature [° C.] of the air present in the environment where the thermal exchange unit operates or of the air entering the thermal exchange unit at the instant t1;
$T_{db,air,t1}$: Dewpoint temperature [° C.] of the air present in the environment where the thermal exchange unit operates at the instant t1 or of the air entering the thermal exchange unit; the dewpoint temperature is determined with known formulas as a function of the temperature and relative humidity of the air present at the instant t1 in the environment where the thermal exchange unit operates or of the air entering the thermal exchange unit ($T_{air,t1}$, $RH_{air,t1}$).
and where:
a1, a2, n and φ0 are coefficients obtained with techniques of curve fitting and/or interpolation, approximating the pairs of values of flow rate of the carrier fluid (φ) and of the thermal power (dQ/dt) obtained with each cycle.

In a 19th aspect according to aspect 17th or 18th said exponential curve is:

$$\frac{dQ}{dt} = [a_1 \cdot |T_{t1} - T_{air,t1}|^n] \cdot (1 - e^{-(\varphi/\varphi_0)})$$

where:

$$A = [a_1 \cdot |T_{t1} - T_{air,t1}|^n]$$

and where:
dQ/dt represents the thermal power [kW] exchanged by the specific thermal exchange unit,
$\varphi$ is the flow rate of the carrier fluid [kg/h] entering the thermal exchange unit,
$T_{t1}$: Temperature [° C.] of the carrier fluid entering the thermal exchange unit, i.e. at the first section at the instant t1;
$T_{air,t1}$: Temperature [° C.] of the air present in the environment where the thermal exchange unit operates or of the air entering the thermal exchange unit at the instant t1;
and where:
a1, n and $\varphi 0$ are coefficients obtained with techniques of curve fitting and/or interpolation, approximating the pairs of values of flow rate of the carrier fluid ($\varphi$) and of the thermal power (dQ/dt) obtained with each cycle.

In a 20th aspect according to any one of the preceding three aspects, the process comprises determining an optimal field of operation of the thermal exchange unit by using the characteristic function, in particular using the coefficient $\varphi_0$ of the exponential curve.

In a 21st aspect according to the preceding aspect the process comprises determining an optimal field of operation of the thermal exchange unit by using the coefficient $\varphi_0$, setting the value of the carrier fluid flow rate such that it does not exceed K $\varphi_0$, where K is a multiplicative factor >1.

In a 22nd aspect according to the preceding aspect the process comprises determining an optimal field of operation of the thermal exchange unit by using the coefficient $\varphi_0$, setting the value of the carrier fluid flow rate such that it does not exceed $2\varphi_0$ or $2.5\varphi_0$ or $3\varphi_0$.

In a 23rd aspect according to any one of the preceding three aspects, the process comprises determining an optimal field of operation of the thermal exchange unit by using the coefficient $\varphi_0$ and setting the value of the carrier fluid flow rate such that it does not fall below K' $\varphi_0$ where K' is a multiplicative factor.

In a 24th aspect according to the preceding aspect K' is a multiplicative factor ≤K.

In a 25th aspect according to aspect 23rd or 24th the process comprises determining an optimal field of operation of the thermal exchange unit by using the coefficient $\varphi_0$, setting the value of the carrier fluid flow rate such that it does not fall below $0.25\,\varphi_0$ or $0.5\varphi_0$ or $0.75\varphi_0$.

In a 26th aspect according to any one of the preceding aspects said cycle provides for a substep of stability verification of the flow rate of the carrier fluid.

In a 27th aspect according to the preceding aspect the process provides for not using, for the step of determining the characteristic functions, the values of temperature difference ($\Delta T$) and of carrier fluid flow rate ($\varphi$) obtained in cycles where the stability verification did not have a positive outcome.

In a 28th aspect according to aspect 26th or 27th, said substep of stability verification comprises
determining a reference flow rate ($\varphi_r$),
comparing the carrier fluid flow rate ($\varphi$) measured at the first instant (t1) or at the second instant (t2) or at the intermediate instant (tm) with the reference flow rate ($\varphi_r$),
establishing that the stability verification has a positive outcome if the difference between reference flow rate ($\varphi_r$) and carrier fluid flow rate ($\varphi$) is lower than a predetermined threshold (S).
The reference flow rate ($\varphi_r$), may in particular be calculated as an/the average value taken by the carrier fluid flow rate ($\varphi$) during the time interval between the first instant (t1) and the second instant (t2), for example determined as the ratio between the control volume V0 and said hydraulic delay (dt=t2−t1).

In a 29th aspect according to the preceding aspect in which establishing that the stability verification has a positive outcome if the difference between reference flow rate ($\varphi_r$) and carrier fluid flow rate ($\varphi$) is lower than a predetermined threshold (S) provides for the following verification:

$$\left| \frac{\frac{V_o}{t2-t1} - \varphi}{\varphi} \right| \leq S$$

In a 30th aspect according to aspect 28th or 29th, the threshold S is =10% or 15% or 20% or higher depending on the stability level that one wishes to maintain.

In a 31st aspect according to any one of the preceding aspects each service line comprises:
at least one flow rate regulator (8) configured for controlling the flow rate of the carrier fluid traversing the thermal exchange unit (7).

In a 32nd aspect according to any one of the preceding aspects each service line comprises:
at least one first thermal sensor (9a) configured for detecting the temperature of the carrier fluid at the first section (5a) of the service line (5) and a second thermal sensor (9b) for detecting the temperature of the carrier fluid at the second section (5b) of the same service line (5).

In a 33rd aspect according to any one of the preceding aspects each service line comprises:
at least one hydraulic sensor (10) configured for determining the flow rate ($\varphi$) of carrier fluid.

For example the flow rate sensor (10) may be positioned downstream the second cross section of the respective service line (5) (see e.g., FIG. 1) or upstream the first section of each service line (5) (example not shown) or between the first and second section of the same service line 5 (FIGS. 2 to 4).

In a 34th aspect according to any one of the preceding aspects the process comprises:
receiving at least one desired value of an operating parameter comprising one from among:
thermal power exchanged by the carrier fluid in the passage through each thermal exchange unit (7),
heat exchanged by the carrier fluid in a predetermined time interval in the passage through each thermal exchange unit (7),
temperature difference ($\Delta T$) between temperature ($T_{t1}$) of the carrier fluid, at the first section, detected at a first instant (t1), and temperature ($T_{t2}$) of the carrier fluid, at the second section, detected at a second instant (t2);
determining, for each thermal exchange unit (1), an actual value of said operating parameter.

In a 35th aspect according to the preceding aspect optionally in which each of said desired values is:
a set value, or
a value calculated as a function of a desired value of the temperature present in the environment where the thermal exchange unit operates, or
a value calculated as a function of a desired value of the temperature of air entering the thermal exchange unit.

In a 36th aspect according to aspect 34th or 35th each plant comprises at least one central thermal treatment group (6) connected at least to the delivery line (3) and comprising:
at least one pump (12) and
at least one cooling unit and/or heating unit (13)
and in which the process also provides for:
comparing said desired value of the operating parameter with said actual value of the same operating parameter,
if following said comparison step it results that, for at least one thermal exchange unit (7), the actual value of the operating parameter is shifted by more than a predetermined threshold from the desired value of the same operating parameter—carrying out a control step comprises at least one from among:
  i. driving the central thermal treatment group (6) for regulating at least one general parameter selected from among: flow rate set for the carrier fluid (in the delivery or return line for example), hydraulic head set for the carrier fluid traversing the central group, heating set for the carrier fluid traversing the central group, cooling set for the carrier fluid traversing the central group,
  ii. driving the flow rate regulator (8) present on the channel (5) of the thermal exchange unit (7)
  iii. driving the thermal exchange modulator (7a) associated with the thermal exchange unit (7), optionally driving the number of revolutions of at least one fan, part of thermal exchange modulator.

In a 37th aspect according to any one of the aspects from the 20th to the preceding during said control step it is provided to maintain the flow rate of the carrier fluid traversing each thermal exchange unit within the respective optimal field of operation.

In a 38th aspect according to any one of the preceding aspects the process comprises determining said characteristic function of the thermal exchange unit a plurality of times at time intervals spaced from each other, e.g. by one or more days, in order to consequently collect a plurality of characteristic curves over time. The time intervals are optionally constant.

In a 39th aspect according to any one of the preceding aspects, the process comprises a procedure for identifying a malfunctioning condition executed at predetermined test instants, optionally periodically, for one or more thermal exchange units.

In a 40th aspect according to the preceding aspect, said procedure for determining a malfunctioning condition comprises the steps of:
measuring at least one actual value of the carrier fluid flow rate traversing such thermal exchange unit,
calculating, on the basis of said at least one actual value of the carrier fluid flow rate, at least one corresponding calculated value of the temperature difference or of the thermal power exchanged by the carrier fluid in the passage through the thermal exchange unit (7), said calculated value being obtained by using a characteristic function determined at a predetermined time instant, in particular the characteristic function determined to be the most recent,
determining the presence of a malfunctioning condition of the exchanger on the basis of the comparison between:
  i. the calculated value of the temperature difference or of the thermal power exchanged by using said relative characteristic function at the predetermined time instant, and
  ii. a further calculated value of the temperature difference or of the thermal power exchanged by using said actual value of the carrier fluid flow rate and a characteristic function determined at a time instant prior to that predetermined.

In a 41st aspect according to the preceding aspect, said procedure for determining a malfunctioning condition comprises the steps of:
measuring at least one actual value of the carrier fluid flow rate traversing such thermal exchange unit,
determining at least one corresponding actual value of said temperature difference of the carrier fluid or of thermal power exchanged by the carrier fluid, in the passage of the carrier fluid itself through the thermal exchange unit (7) at said actual carrier flow rate value,
calculating, on the basis of said at least one actual value of the carrier fluid flow rate, at least one corresponding calculated value of the temperature difference or of the thermal power exchanged by the carrier fluid in the passage through the thermal exchange unit (7), said calculated value being obtained by using a characteristic function determined at a predetermined time instant, in particular prior to that of measurement of the actual value of the carrier fluid flow rate,
determining the presence of a malfunctioning condition of the exchanger on the basis of the comparison between:
  i. the calculated value of the temperature difference or of the thermal power exchanged by using said relative characteristic function at the predetermined time instant, and
  ii. the actual value of the temperature difference or of the thermal power exchanged.

In a 42nd aspect according to the 40th or the 41st aspect, in which determining the presence of the malfunctioning condition comprises establishing that there is a malfunctioning condition if, following said comparison, one obtains between the values that are the object of the comparison a discrepancy greater than predetermined threshold.

In a 43rd aspect according to the preceding aspect in which the procedure comprises a step of classifying a type of malfunctioning detected come:
malfunctioning caused by progressive deterioration if said discrepancy, compared with the interval between said predetermined instant and said preceding instant, or compared with the interval between the instant of measurement of the actual value of the carrier fluid flow rate and said predetermined instant is lower than a limit value,
malfunctioning due to improper use or damage of the terminal if said discrepancy, compared with the interval between said predetermined instant and said preceding instant, or compared with the interval between the instant of measurement of the actual value of the carrier fluid flow rate and said predetermined instant, is greater than said limit value.

A 44th aspect regards a process for monitoring and/or controlling at least one air conditioning and/or heating plant (1), said plant comprising at least one delivery line (3), at least one return line (4) and a predetermined number of service lines (5) hydraulically interposed between the delivery line (3) and the return line (4), each service line (5) comprising at least one thermal exchange unit (7), and optionally at least one thermal exchange modulator (7a) associated with the thermal exchange unit (7),
in which said process provides, for at least one of said service lines (5), the steps of
circulating a carrier fluid through at least one service line, repeating a plurality of times a cycle in turn comprising the following substeps:

a) determining at least one value of the temperature difference (ΔT) between:
the temperature ($T_{t1}$) of the carrier fluid, at a first section of the service line upstream of the thermal exchange unit (7) and
the temperature ($T_{t2}$) of the carrier fluid, at the second section of the same service line successively placed downstream of the thermal exchange unit (7),
b) detecting the value (φ) of the carrier fluid flow rate traversing the thermal exchange unit (7),
c) determining the thermal power exchanged (dQ/dt) by the thermal exchange unit, on the basis of the value of the carrier fluid flow rate (φ) traversing the thermal exchange unit (7) and of the temperature difference (ΔT).

In a 45th aspect according to the preceding aspect the step of determining the thermal power exchanged (dQ/dt) by the thermal exchange unit, on the basis of the value of the carrier fluid flow rate (φ) traversing the thermal exchange unit (7) and of the temperature difference (ΔT), allows obtaining, in each cycle, a set of three values comprising:
the value of said temperature difference (ΔT),
the value of said carrier fluid flow rate (φ) and
the corresponding value of said thermal power exchanged (dQ/dt) by the thermal exchange unit In a 46th aspect according to any one of the preceding two aspects, the process comprises the step of:
determining a characteristic function of the thermal exchange unit present in said service line which relates a thermal power exchanged (dQ/dt) by the thermal exchange unit with the value of the carrier fluid flow rate (φ), said characteristic function of the thermal exchange unit being determined by using a plurality of values of thermal power exchanged and of carrier fluid flow rate obtained with respective cycles.

In a 47th aspect according to the preceding aspect, the characteristic function of the thermal exchange unit present in said service line which relates the thermal power exchanged with the value of the carrier fluid flow rate is an exponential curve of type:

$$\frac{dQ}{dt} = A * \left(1 - e^{-\left(\frac{\varphi}{\varphi 0}\right)}\right)$$

where:
dQ/dt represents the thermal power exchanged by the specific thermal exchange unit,
φ is the flow rate of the carrier fluid entering the thermal exchange unit,
A and $\varphi_0$ are obtained with techniques of curve fitting and/or interpolation, approximating the pairs of values of flow rate of the carrier fluid ($\varphi_{tm}$) and of the thermal power (dQ/dt) obtained with each cycle.

In a 48th aspect according to the preceding aspect, in which said exponential curve is:

$$\frac{dQ}{dt} = \left[a_1 \cdot |T_{t1} - T_{air,t1}|^n + a_2 \cdot \left(1 - \text{Min}\left(1, \frac{T_{air,t1} - T_{db,air,t1}}{T_{air,t1} - T_{t1}}\right)\right)^n\right] \cdot (1 - e^{-(\varphi/\varphi 0)})$$

where:

$$A = \left[a_1 \cdot |T_{t1} - T_{air,t1}|^n + a_2 \cdot \left(1 - \text{Min}\left(1, \frac{T_{air,t1} - T_{db,air,t1}}{T_{air,t1} - T_{t1}}\right)\right)^n\right]$$

where:
dQ/dt represents the thermal power [kW] exchanged by the specific thermal exchange unit,
φ is the flow rate of the carrier fluid [kg/h] entering the thermal exchange unit,
$T_{t1}$: Temperature [° C.] of the carrier fluid entering the thermal exchange unit, i.e. at the first section at the instant t1;
$T_{air,t1}$: Temperature [° C.] of the air present in the environment where the thermal exchange unit operates or of the air entering the thermal exchange unit at the instant t1;
$T_{db,air,t1}$: Dewpoint temperature [° C.] of the air present in the environment where the thermal exchange unit operates at the instant t1 or of the air entering the thermal exchange unit; the dewpoint temperature is determined with known formulas as a function of the temperature and relative humidity of the air present at the instant t1 in the environment where the thermal exchange unit operates or of the air entering the thermal exchange unit ($T_{air,t1}$, $RH_{air,t1}$).

and where:
a1, a2, n and φ0 are coefficients obtained with techniques of curve fitting and/or interpolation, approximating the pairs of values of flow rate of the carrier fluid (φ) and of the thermal power (dQ/dt) obtained with each cycle.

In a 49th aspect according to any one of the preceding two aspects said exponential curve is:

$$\frac{dQ}{dt} = [a_1 \cdot |T_{t1} - T_{air,t1}|^n] \cdot (1 - e^{-(\varphi/\varphi 0)})$$

where:
$$A = [a_1 \cdot |T_{t1} - T_{air,t1}|^n]$$

and where:
dQ/dt represents the thermal power [kW] exchanged by the specific thermal exchange unit,
φ is the flow rate of the carrier fluid [kg/h] entering the thermal exchange unit,
$T_{t1}$: Temperature [° C.] of the carrier fluid entering the thermal exchange unit, i.e. at the first section at the instant t1;
$T_{air,t1}$: Temperature [° C.] of the air present in the environment where the thermal exchange unit operates or of the air entering the thermal exchange unit at the instant t1;
and where:
a1, n and $\varphi_0$ are coefficients obtained with techniques of curve fitting and/or interpolation, approximating the pairs of values of flow rate of the carrier fluid (φ) and of the thermal power (dQ/dt) obtained with each cycle.

In a 50th aspect according to any one of the preceding three aspects, the process comprises determining an optimal field of operation of the thermal exchange unit by using the characteristic function, in particular using the coefficient $\varphi_0$ of the exponential curve In a 51st aspect according to the preceding aspect, the process comprises determining an optimal field of operation of the thermal exchange unit by using the coefficient $\varphi_0$, setting the value of the carrier fluid flow rate such that it does not exceed K $\varphi_0$, where K is a multiplicative factor >1.

In a 52nd aspect according to the preceding aspect the process comprises determining an optimal field of operation of the thermal exchange unit by using the coefficient $\varphi_0$, setting the value of the carrier fluid flow rate such that it does not exceed $2\varphi_0$ or $2.5\varphi_0$ or $3\varphi_0$.

In a 53rd aspect according to any one of the preceding three aspects the process comprises determining an optimal field of operation of the thermal exchange unit by using the coefficient $\varphi_0$ and setting the value of the carrier fluid flow rate such that it does not fall below K' $\varphi_0$ where K' is a multiplicative factor.

In a 54th aspect according to the preceding aspect K' is a multiplicative factor ≤K.

In a 55th aspect according to aspect 53rd or 54th the process comprises determining an optimal field of operation of the thermal exchange unit by using the coefficient $\varphi_0$, setting the value of the carrier fluid flow rate such that it does not fall below 0.25 $\varphi_0$ or $0.5\varphi_0$ or $0.75\varphi_0$.

In a 56th aspect according to any one of the preceding aspects each service line comprises:
  at least one flow rate regulator (8) configured for controlling the flow rate of the carrier fluid traversing the thermal exchange unit (7),
  at least one first thermal sensor (9a) configured for detecting the temperature of the carrier fluid at the first section (5a) of the service line (5) and a second thermal sensor (9b) for detecting the temperature of the carrier fluid at the second section (5b) of the same service line (5),
  at least one hydraulic sensor (10) configured for determining the flow rate ($\varphi$) of carrier fluid.

As mentioned the hydraulic sensor or flow rate sensor (10) may be positioned downstream the second cross section of the respective service line (5) (see e.g., FIG. 1) or upstream the first section of each service line (5) (example not shown) or between the first and second section of the same service line 5 (FIGS. 2 to 4).

In a 57th aspect according to any one of the preceding aspects the process comprises:
receiving at least one desired value of an operating parameter comprising one from among:
  thermal power exchanged by the carrier fluid in the passage through each thermal exchange unit (7),
  heat exchanged by the carrier fluid in a predetermined time interval in the passage through each thermal exchange unit (7),
  temperature difference ($\Delta T$) between temperature ($T_{t1}$) of the carrier fluid, at the first section, detected at a first instant (t1), and temperature ($T_{t2}$) of the carrier fluid, at the second section, detected at a second instant (t2) which can coincide with or be prior to the first instant;
determining, for each thermal exchange unit (1), an actual value of said operating parameter.

In a 58th aspect according to the preceding aspect optionally in which the desired value of the operating parameter is:
  a set value, or
  a value calculated as a function of a desired value of the temperature present in the environment where the thermal exchange unit operates, or
  a value calculated as a function of a desired value of the temperature of air entering the thermal exchange unit;

In a 59th aspect according to any one of the preceding aspects each plant comprises at least one central thermal treatment group (6) connected at least to the delivery line (3) and comprising:
  at least one pump (12) and
  at least one cooling unit and/or heating unit (13)
and in which the process also provides for:
  comparing said desired value of the operating parameter with said actual value of the same operating parameter,
  if following said comparison step it results that, for at least one thermal exchange unit (7), the actual value of the operating parameter is shifted by more than a predetermined threshold from the desired value of the same operating parameter, carrying out a control step comprises at least one from among:
    i. driving the central thermal treatment group (6) for regulating at least one general parameter selected from among: flow rate set for the carrier fluid, hydraulic head set for the carrier fluid traversing the central group, heating set for the carrier fluid traversing the central group, cooling set for the carrier fluid traversing the central group,
    ii. driving the flow rate regulator (8) present on the channel (5) of the thermal exchange unit (7)
    iii. driving the thermal exchange modulator (7a) associated with the thermal exchange unit (7), optionally driving the number of revolutions of at least one fan part of thermal exchange modulator.

In a 60th aspect according to the preceding aspect said control step provides for maintaining the flow rate of the carrier fluid traversing each thermal exchange unit within the respective optimal field of operation.

In a 61st aspect according to any one of the preceding aspects the process comprises the step of determining said characteristic function of the thermal exchange unit has a plurality of times at time intervals spaced from each other, e.g. by one or more days, in order to consequently collect a plurality of characteristic curves over time.

In a 62nd aspect according to the preceding aspect, said procedure for determining a malfunctioning condition comprises the steps of:
  measuring at least one actual value of the carrier fluid flow rate traversing such thermal exchange unit,
  calculating, on the basis of said at least one actual value of the carrier fluid flow rate, at least one corresponding calculated value of the temperature difference or of the thermal power exchanged by the carrier fluid in the passage through the thermal exchange unit (7), said calculated value being obtained by using a characteristic function determined at a predetermined time instant, in particular the characteristic function determined to be the most recent,
  determining the presence of a malfunctioning condition of the exchanger on the basis of the comparison between:
    i. the calculated value of the temperature difference or of the thermal power exchanged by using said relative characteristic function at the predetermined time instant, and
    ii. a further calculated value of the temperature difference or of the thermal power exchanged by using said actual value of the carrier fluid flow rate and a characteristic function determined at a time instant prior to that predetermined.

In a 63rd aspect according to the preceding aspect, said procedure for determining a malfunctioning condition comprises the steps of:
  measuring at least one actual value of the carrier fluid flow rate traversing such thermal exchange unit,
  determining at least one corresponding actual value of said temperature difference of the carrier fluid or of thermal power exchanged by the carrier fluid, in the passage of the carrier fluid itself through the thermal exchange unit (7) at said actual carrier flow rate value, calculating, on the basis of said at least one actual value of the carrier fluid flow rate, at least one corresponding calculated value of the temperature difference or of the thermal power exchanged by the carrier fluid in the passage through the thermal exchange unit (7), said calculated value being obtained by using a characteristic function determined at a predetermined time instant, in particular prior to that of measurement of the actual value of the carrier fluid flow rate, determining the presence of a malfunctioning condition of the exchanger on the basis of the comparison between:
  i. the calculated value of the temperature difference or of the thermal power exchanged by using said relative characteristic function at the predetermined time instant, and
  ii. the actual value of the temperature difference or of the thermal power exchanged.

In a 64th aspect according to the 62nd or the 63rd aspect in which determining the presence of the malfunctioning condition comprises establishing that there is a malfunctioning condition if, following said comparison, one obtains between the values that are the object of the comparison a discrepancy greater than predetermined threshold.

In a 65th aspect according to the preceding aspect in which the procedure comprises a step of classifying a type of malfunctioning detected as:
  malfunctioning caused by progressive deterioration if said discrepancy, compared with the interval between said predetermined instant and said preceding instant, or compared with the interval between the instant of measurement of the actual value of the carrier fluid flow rate and said predetermined instant is lower than a limit value,
  malfunctioning due to improper use or damage of the terminal if said discrepancy, compared with the interval between said predetermined instant and said preceding instant, or compared with the interval between the instant of measurement of the actual value of the carrier fluid flow rate and said predetermined instant, is greater than said limit value.

A 66th aspect regards a process for monitoring and/or controlling an air conditioning and/or heating plant (1), said plant comprising:
  at least one delivery line (3), at least one return line (4),
  a predetermined number of service lines (5) hydraulically interposed between the delivery line (3) and the return line (4), each service line (5) comprising at least one thermal exchange unit (7), at least one flow rate regulator (8) configured for controlling the flow rate of the carrier fluid traversing the thermal exchange unit (7), and
  at least one central thermal treatment group (6) connected to the respective delivery line (3),
in which said process provides, for at least one of said service lines (5), the steps of
  circulating a carrier fluid through at least one service line so that a same carrier fluid traversing a first section (5*a*) of the service line upstream of the thermal exchange unit (7) traverses a second section (5*b*) of the same service line placed successively downstream of the thermal exchange unit (7), with a hydraulic delay (dt) given by a time necessary for the same fluid particle to pass from the first to the second section,
  determining at least one value of the temperature difference ($\Delta T$) between:

the temperature ($T_{t1}$) of the carrier fluid, at the first section, detected at a first instant (t1), and the temperature ($T_{t2}$) of the carrier fluid, at the second section, detected at a second instant (t2), wherein the second instant is subsequent to the first instant (t1) by said hydraulic delay (dt)

driving at least one from among:
  the central thermal treatment group (6),
  the flow rate regulator (8),
  a thermal exchange modulator (7*a*) associated with the thermal exchange unit (7),
as a function of
  the temperature difference as measured above, or of an actual value of an operating parameter in turn being a function of the temperature difference as measured above, and
  a desired value of an operating parameter.

In a 67th aspect according to the preceding aspect in which the thermal exchange unit comprises a fan, for example active on an air distribution line, and in which the process provides for driving the fan and in particular for varying the angular speed of the fan as a function of:
  the temperature difference as measured above, or of an actual value of an operating parameter in turn a function of the temperature difference as measured above, and
  the desired value of an operating parameter.

In a 68th aspect according to any one of the two preceding aspects, said cycle comprises the further steps of detecting the value ($\varphi$) of the carrier fluid flow rate traversing the thermal exchange unit (7), wherein the value of the carrier fluid flow rate ($\varphi$) traversing the thermal exchange unit (7) is one of:
  the carrier fluid flow rate ($\varphi$) detected at the first instant (t1),
  the carrier fluid flow rate ($\varphi$) detected at the second instant (t2),
  the carrier fluid flow rate ($\varphi$) detected at an intermediate instant (tm) between the first and the second instant (t1 and t2), in particular placed at the midpoint of the time interval between the first instant (t1) and the second instant (t2),
  the average value taken by the carrier fluid flow rate ($\varphi$) during the time interval between the first instant (t1) and the second instant (t2), in particular calculated as:

$$\int_{t1}^{t2}(\varphi(t))dt/(t2-t1)$$

or as:

$$(V0)/(t2-t1)$$

with V0 being a/the control volume equal to the volume of carrier fluid contained between said first and said second section;

the cycle further including determining as actual value of the operating parameter the thermal power exchanged (dQ/dt) by the thermal exchange unit determined on the basis of said value of the carrier fluid flow rate ($\varphi$) traversing the thermal exchange unit (7) and of said temperature difference ($\Delta T$).

In a 69th aspect according to any one of the preceding three aspects the step of driving at least one between the central thermal treatment group (6), the flow rate regulator (8) and the thermal exchange modulator (7*a*) comprises:
  receiving, for each thermal exchange unit (7) at least one desired value of an operating parameter comprising one from among:

i. thermal power exchanged by the carrier fluid in the passage through each thermal exchange unit (7),
ii. heat exchanged by the carder fluid in a predetermined time interval in the passage through each thermal exchange unit (7),
iii. temperature difference (ΔT) between the temperature ($T_{t1}$) measured at the first instant (t1) and the temperature ($T_{t2}$) measured at the second instant (2), determining, for each thermal exchange unit (7), an actual value of said operating parameter by using at least the value of said temperature difference (ΔT) between the temperature ($T_{t1}$) measured at the first instant (t1) and the temperature ($T_{t2}$) measured at the second instant (2), comparing the desired value of the operating parameter with the corresponding actual value of the same operating parameter, and if following said comparison step it results that, for at least one thermal exchange unit (7), the actual value of the operating parameter is shifted by more than a predetermined threshold from the desired value of the same operating parameter, carrying out a control step on one or more of the central group, flow rate regulator and thermal exchange modulator, said control step being aimed to align or reduce a difference between the actual value and the desired value of the operating parameter.

In a 70th aspect according to any one of the preceding aspects from the 66th to the 68th, the step of driving at least one between the central thermal treatment group (6) and the flow rate regulator (8) comprises:

receiving, for each thermal exchange unit (7), at least one desired value of an operating parameter comprising one from among:
i. thermal power exchanged by the carrier fluid in the passage through each thermal exchange unit (7),
ii. heat exchanged by the carrier fluid in a predetermined time interval in the passage through each thermal exchange unit 7,
iii. temperature difference (ΔT) between the temperature ($T_{t1}$) measured at the first instant (t1) and the temperature ($T_{t2}$) measured at the second instant (t2), determining, for each thermal exchange unit (7), an actual value of said operating parameter by using at least the value of said temperature difference (ΔT) between the temperature ($T_{t1}$) measured at the first instant (t1) and the temperature ($T_{t2}$) measured at the second instant (t2), and at least the value of said carrier fluid flow rate (φ), comparing the desired value of the operating parameter with the corresponding actual value of the same operating parameter, and if following said comparison step it results that, for at least one thermal exchange unit (7), the actual value of the operating parameter is shifted by more than a predetermined threshold from the desired value of the same operating parameter, carrying out a control step on one or more of the central group, flow rate regulator and thermal exchange modulator, said control step being aimed to align or reduce a difference between the actual value and the desired value of the operating parameter.

In a 71st aspect according to any one of the preceding two aspects the control step comprises at least one from among:
driving the central thermal treatment group (6) for regulating at least one general parameter selected from among: flow rate set for the carrier fluid, hydraulic head set for the carrier fluid traversing the central group, heating set for the carrier fluid traversing the central group, cooling set for the carrier fluid traversing the central group, driving the flow rate regulator (8) present on the service line (5) of the thermal exchange unit (7), driving the thermal exchange modulator (7a) associated with the thermal exchange unit (7).

In a 72nd aspect according to any one of the aspects from the 66th to the preceding aspect, each service line comprises:
at least one first thermal sensor (9a) configured for detecting the temperature of the carrier fluid at the first section (5a) of the service line (5) and a second thermal sensor (9b) for detecting the temperature of the carrier fluid at the second section (5b) of the same service line (5),
at least one hydraulic sensor (10) configured for determining the flow rate (φ) of carrier fluid.

As mentioned the hydraulic sensor or flow rate sensor (10) may be positioned downstream the second cross section of the respective service line (5) (see e.g., FIG. 1) or upstream the first section of each service line (5) (example not shown) or between the first and second section of the same service line 5 (FIGS. 2 to 4).

In a 73rd aspect according to any one of the aspects from the 66th to the preceding aspect the process provides for the execution of one of the following steps:
receiving a value of the hydraulic delay (dt) between said first and said second section of the same service line,
determining a value of the hydraulic delay (dt) between said first and said second section of the same service line,
determining the second instant (t2), which is subsequent to said hydraulic delay (dt) with respect to the first instant (t1).

In a 74th aspect according to the preceding aspect the step of determining said hydraulic delay (dt) which comprises:
determining or receiving a value of a control volume (V0), which is a value representative of the volume of carrier fluid volume contained between said first and said second section, and
calculating the hydraulic delay as the time interval starting from the first instant (t1) and necessary so that a carrier fluid volume equal to the control volume (V0) traverses the first section (5a);

or wherein the process provides for determining the second instant (t2), which comprises:
determining or receiving a value of a control volume (V0), which is a value representative of the volume of carrier fluid contained between said first and said second section, and
determining the second instant (t2) as the instant at which, a carrier fluid volume equal to the control volume (V0) has traversed the first section (5a), with measuring of carrier fluid volume traversing the first cross section starting from the first instant (t1).

In a 75th aspect according to the preceding aspect determining the control volume (V0) in turn comprises:
measuring a temperature of the carrier fluid at the first section and at the second section of the service line,
varying the temperature of the carrier fluid entering said service line,
identifying an initial instant (ts) in which the temperature of the carrier fluid at the first section varies, optionally beyond a predetermined threshold, identifying a final instant (tf) in which the temperature of the carrier fluid at the second section varies, optionally beyond a predetermined threshold, measuring values of the carrier fluid flow rate (φ(t)) during an interval comprised between said initial instant and said final instant, calculating the control volume (V0) on the basis of the values assumed by the carrier fluid flow rate in the interval between said initial instant and said final instant.

In a 76th aspect according to the preceding aspect calculating the control volume (V0) on the basis of the values assumed by the carrier fluid flow rate in the interval between said initial instant and said final instant provides for using the following formula:

$$\int_{ts}^{tf}(\varphi(t))dt = V0$$

in which:

φ(t) represents the value of the carrier fluid flow rate over time, ts is the initial instant, tf is the final instant.

In a 77th aspect according to any one of the aspects from the 66th to the preceding aspect, the value of the carrier fluid flow rate (φ) traversing the thermal exchange unit (7) is one of the carrier fluid flow rate (φ) detected at the first instant (t1), the carrier fluid flow rate (φ) detected at the second instant (t2), the carrier fluid flow rate (φ) detected at an intermediate instant (tm) between the first and the second instant (t1 and t2), in particular placed at the midpoint of the time interval between the first instant (t1) and the second instant (t2), the average value taken by the carder fluid flow rate (φ) during the time interval between the first instant (t1) and the second instant (t2), in particular calculated as:

$$\int_{t1}^{t2}(\varphi(t))dt/(t2-t1)$$

or as:

(V0)/(t2−t1)

with V0 being a/the control volume equal to the volume of carder fluid contained between said first and said second section.

Preferably, the value of the carrier fluid flow rate (φ) traversing the thermal exchange unit (7) is detected at the first instant or at an intermediate instant (tm), in particular placed at the midpoint of the time interval between the first instant (t1) and the second instant (t2).

In a 78th aspect according to any one of the aspects from the 66th to the preceding, the process provides for a stability verification of the flow rate which comprises:

determining a reference flow rate (φ$_r$) as the ratio between the control volume V0 and said hydraulic delay (dt=t2−t1), comparing the carrier fluid flow rate (φ) measured at the detection instant (tm) with the reference flow rate (φ$_r$), establishing that the stability verification has a positive outcome if the difference between reference flow rate (φ$_r$) and carrier fluid flow rate (φ) is lower than a predetermined threshold (S).

In a 79th aspect according to the preceding aspect in which establishing that the stability verification has a positive outcome if the difference between reference flow rate (φ$_r$) and carrier fluid flow rate (φ) is lower than a predetermined threshold (S) provides for the following verification:

$$\left| \frac{\frac{V0}{t2-t1} - \varphi}{\varphi} \right| \leq S$$

In an 80th aspect according to aspect 78th or 79th, the threshold S is =10% or 15% or 20% or higher depending on the stability level that one wishes to maintain.

An 81st aspect regards a control unit configured or programmed for executing a process in accordance with any one of the preceding aspects.

An 82nd aspect regards a software program which, when executed by a control unit, programs such control unit to execute a process according to any one of the preceding aspects.

An 83rd aspect regards a memory support for a software program which, when executed by a control unit, programs such control unit to execute a process according to any one of the preceding aspects.

An 84th aspect regards a device for monitoring and/or controlling an air conditioning and/or heating plant (1) comprising control unit (24; 24a, 24b) configured or programmed for executing the process according to any one of the preceding aspects.

An 85th aspect regards a device for monitoring and/or controlling an air conditioning and/or heating plant (1), said plant comprising at least one delivery line (3), at least one return line (4) and a predetermined number of service lines (5) hydraulically interposed between the delivery line and the return line, and at least one central thermal treatment group (6) connected to the respective delivery line (3), each service line (5) comprising at least one thermal exchange unit (7), optionally at least one thermal exchange modulator (7a) being associated with the respective thermal exchange unit (7), said device comprising:

at least one flow rate regulator (8) configured for controlling the flow rate of carrier fluid traversing the thermal exchange unit (7), at least one first thermal sensor (9a) configured for detecting the temperature of the carrier fluid at a first section (5a) of the service line (5) upstream of the thermal exchange unit (7) and a second thermal sensor (9b) for detecting the temperature of the carrier fluid at a second section (5b) of the same service line (5) downstream of the thermal exchange unit (7), at least one hydraulic sensor (10) configured for determining the flow rate (φ) of carrier fluid, at least one control unit (24; 24a, 24b) connected or connectable with the flow rate regulator (8) and/or with the central group (6), with the first and the second thermal sensor (9), with the hydraulic sensor and optionally with the thermal exchange modulator (7a), said control unit (24; 24a, 24b) being configured for executing the process according to any one of the preceding aspects.

As mentioned the hydraulic sensor or flow rate sensor (10) may be positioned downstream the second cross section of the respective service line (5) (see e.g., FIG. 1) or upstream the first section of each service line (5) (example not shown) or between the first and second section of the same service line 5 (FIGS. 2 to 4).

An 86th aspect regards an air conditioning and/or heating plant comprising at least one circuit (2) for distributing a carrier fluid, each circuit (2) comprising:
- at least one delivery line (3) of the carrier fluid,
- at least one return line (4) of the carrier fluid,
- a plurality of service lines (5) connected directly or indirectly with said delivery line (3) and with said return line (4) and configured for serving respective environments to be air conditioned and/or heated, in which each of said service lines (5) comprises in turn:
  - at least one thermal exchange unit (7), optionally at least one thermal exchange modulator (7a) being associated with the respective thermal exchange unit (7),
  - at least one flow rate regulator (8) configured for controlling the flow rate of carrier fluid traversing the thermal exchange unit (7),
  - at least one first thermal sensor (9a) configured for detecting the temperature of the carrier fluid at a first section (5a) of the service line (5) upstream of the thermal exchange unit (7) and a second thermal sensor (9b) for detecting the temperature of the carrier fluid at a second section (5b) of the same service line (5) downstream of the thermal exchange unit (7), and
  - at least one hydraulic sensor (10) configured for determining the flow rate ($\varphi$) of carrier fluid,
- at least one central thermal treatment group (6) placed on the respective circuit (2),
- at least one control unit (24; 24a, 24b) connected or connectable with the flow rate regulator (8) and/or with the central group (6), with the first and the second thermal sensor (9), with the hydraulic sensor (10) and optionally with the thermal exchange modulator (la),
- said control unit (24; 24a, 24b) being configured for executing the process according to any one of the preceding aspects.

As mentioned the hydraulic sensor or flow rate sensor (10) may be positioned downstream the second cross section of the respective service line (5) (see e.g., FIG. 1) or upstream the first section of each service line (5) (example not shown) or between the first and second section of the same service line 5 (FIGS. 2 to 4).

In an 87th aspect according to any one of the preceding aspects the cycle is repeated, in particular repeated under the command of the control unit, regularly, in particular, periodically. For example the cycle may be repeated at intervals of 10 seconds.

In an 88th aspect the process provides for executing during the cycle a power correction routine comprising:
- detecting if flow rate of the carrier fluid through the thermal exchange unit (7) is zero or below a minimum flow rate threshold, during a time interval between the first instant (t1) and the second instant (t2),
- assigning a conventional value to the thermal power exchanged during said time interval if it has been detected that flow rate of the carrier fluid through the thermal exchange unit (7) is zero or below the minimum flow rate threshold in at least one time instant (t0) during the same time interval.

In an 89th aspect according to the preceding aspect the conventional value assigned to the overall thermal power exchanged during the entire time interval between the first instant (t1) and the second instant (t2) is zero if it has been detected that the flow rate of the carrier fluid through the thermal exchange unit (7) is zero or below the minimum flow rate threshold in at least one time instant (t0) during the time interval between the first instant (t1) and the second instant (t2).

In a 90th aspect according to the 88th aspect the conventional value assigned to the overall thermal power exchanged during the entire time interval between the first instant (t1) and the second instant (t2) is the accumulated thermal power exchanged from the first instant (t1) until the instant (t0) of detection that the flow rate of the of the carrier fluid through the thermal exchange unit (7) is zero or below the minimum flow rate threshold.

Note that in accordance with any one of the above aspects the second instant t2 (or the delay dt) may be determined not counting the time at zero flow rate and thus determining t2 by counting only time elapsed after the first time instant t1 with presence of flow rate, such that in case of stop of the flow rate the duration of a cycle may last until after restart of flow through the service line (5).

BRIEF DESCRIPTION OF THE DRAWINGS

Several embodiments and several aspects of the finding will be described hereinbelow with reference to the enclosed drawings, provided only as a non-limiting example in which.

DEFINITIONS

Figure 1:
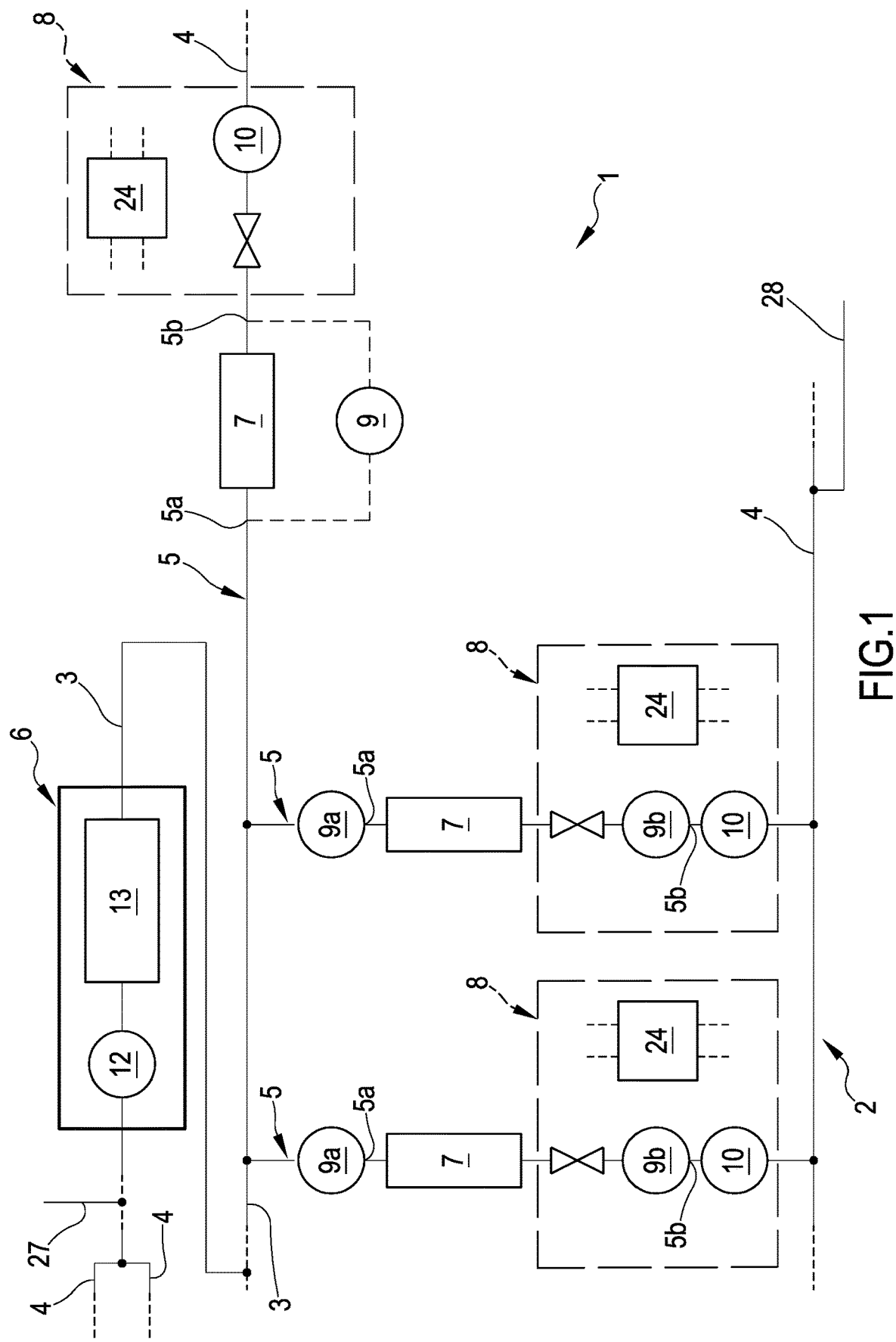
FIG. 1 is a non-limiting schematization of an air conditioning and/or heating plant in accordance with the present invention.

The figures could illustrate the object of the invention or parts thereof by means of representations that are not in scale; therefore, parts and components illustrated in the figures relative to the object of the invention may exclusively regard schematic representations.

With the term carrier fluid or heat carrier fluid, it is intended a substance in liquid or gaseous state capable of receiving, storing, transporting and transferring heat. For example, in a heating plant it is possible to use water as carrier fluid, in particular hot water, or mixtures of hot water and glycols. In an air conditioning plant, it is instead possible to employ, as carrier fluid, a gas or coolant liquids of natural type (e.g. ammonia and carbon dioxide), cold water, mixtures of water with glycol or other antifreeze substances.

With flow rate of the carrier fluid, it is intended the mass flow rate expressed for example in kilograms per hour kg/h of carrier fluid.

With thermal power exchanged dQ/dt by the thermal exchange unit, for example expressed in kilowatt kW, it is intended the heat absorbed or transferred by the thermal exchange unit per unit of time.

With the term central thermal treatment group (indicated with 6 in the drawings), it is intended a group comprising a heating unit 13 (e.g. a boiler unit, or a heat pump, or a solar panel system or other heating device) configured for the heating of a carrier fluid (typically a liquid) and for supplying the hot carrier fluid to a hydraulic distribution circuit which serves one or more suitable thermal treatment units or operating utility device devices at respective environments to be treated. The central thermal treatment group may also, or may alternatively, comprise a cooling unit (also indicated with 13 in the enclosed figures) configured for treating (cooling) a carrier fluid and for sending the carrier fluid to a distribution circuit adapted to serve one or more suitable thermal treatment units for the air conditioning/climate control of respective environments to be treated. The central thermal treatment group also comprises at least one pump indicated with 12 in the enclosed drawings, or other means having the task of facilitating the circulation of the carrier fluid towards and into the distribution circuit.

DETAILED DESCRIPTION

Air Conditioning and/or Heating Plant

With reference to the enclosed figures, reference number 1 overall indicates an air conditioning and/or heating plant. As is visible for example in FIG. 1, the plant 1 comprises a circuit 2 for distributing a carrier fluid; the circuit 2 has at least two main channels, i.e.: a delivery line 3, for sending the carrier fluid to a predetermined number of users or thermal exchange units 7, and a return line 4 in fluid connection with the delivery line 3 and arranged for receiving the carrier fluid downstream of each of the units 7. As is visible from FIG. 1, the distribution circuit 2 comprises a plurality of circulation channels or service lines 5 directly or indirectly in connection with the delivery line 3 and with the return line 4 and configured for serving respective environments to be air conditioned and/or heated; each service line 5 is configured for supplying at least one respective thermal exchange unit 7. FIG. 1 illustrates a preferred but non-limiting configuration of the invention, in which each service line 5 is interposed between delivery line 3 and return line 4 and serves a respective thermal exchange unit 7: in such configuration, the lines 5 are arranged in parallel with each other and receive fluid from the delivery line in order to then return it to the return line after the passage of the fluid from the respective unit 7; in this configuration, it is possible to send only one type of fluid to each unit 7: for example, if the central group 6 comprises a heating unit 13 (or cooling unit) each of the channels 5 receives heated fluid (or cooled fluid, respectively) from the central group 6 and discharges on the return line fluid that is cooled (or heated, respectively) following the passage through the respective unit 7.

Figure 9:
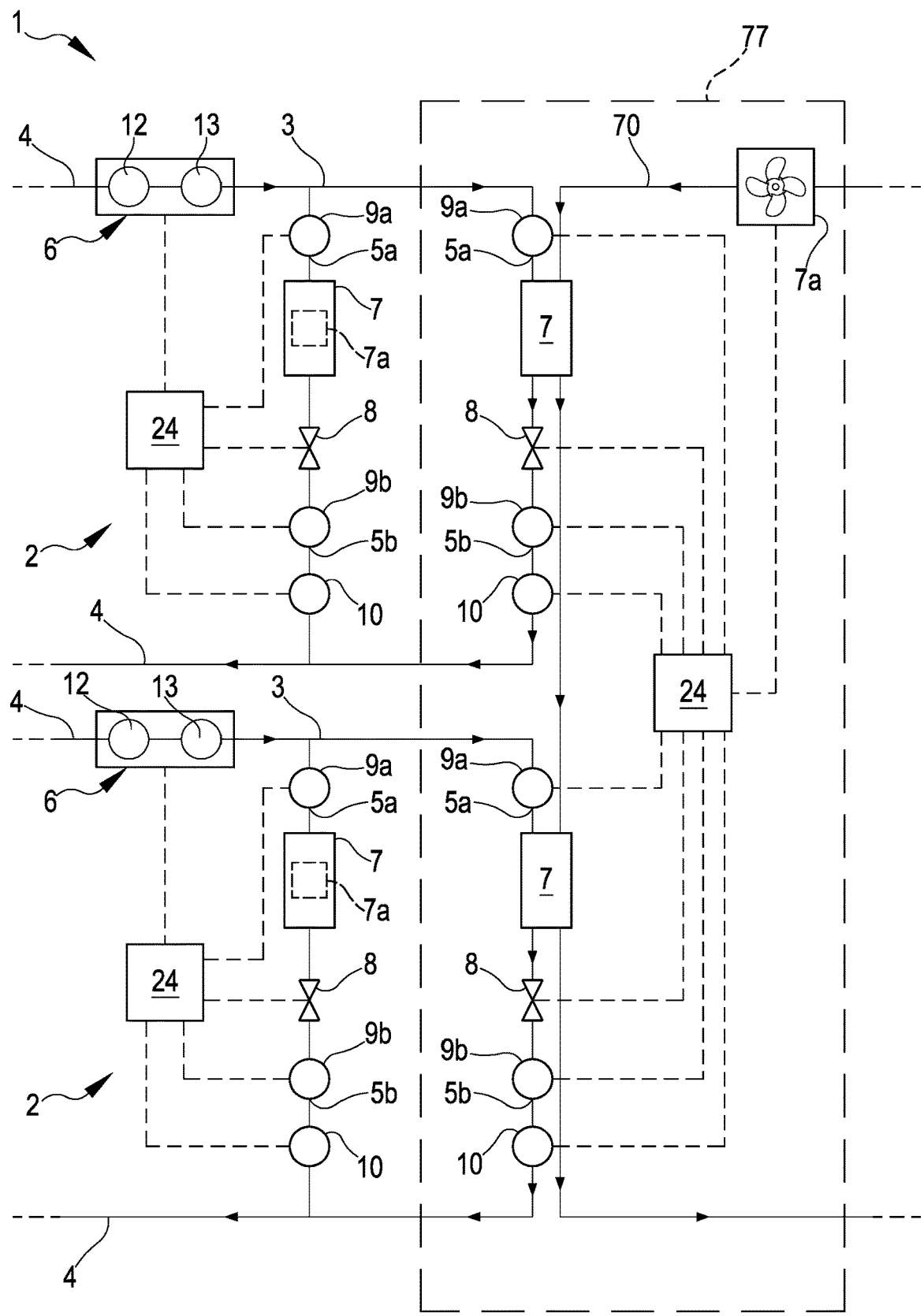
FIG. 9 is a non-limiting schematization of a variant of an air conditioning and/or heating plant in accordance with the present invention.

Nevertheless, it is possible to have two or more delivery lines 3: for example, as illustrated in FIG. 9, a delivery line 3 conveying cooling fluid coming from a cooling unit 13 of a group 6 and intended to supply a respective distribution circuit 2, and a delivery line 3 coming from a heating unit of the same group 6 or of a separate central group 6: FIG. 9 represents two separate central groups 6 which serve respective distribution circuits 2, one circulating hot fluid and one circulating cold fluid. In FIG. 9, each distribution circuit 2 then has a respective return line 4 which returns the 'used' carrier fluid to the corresponding group 6. In the example of FIG. 9, each distribution circuit 2 serves a plurality of service lines (in FIG. 9, two are shown for each circuit 2, merely as an example), for example placed in parallel with each other. Also in this case, on each service line 5, a respective thermal exchange unit 7 operates. FIG. 9 shows an example in which two thermal exchange units 7 (for example constituted by exchangers having one side in which it circulates carrier fluid coming from a group 6 and one side in which circulates air to be air conditioned or heated) are placed, each on a respective one of the two distribution circuits 2 shown in FIG. 9, while having nevertheless the air side constituting part of a same air treatment unit (indicated overall with 77) which can then be heated by one of the units 7 and cooled by the other of the units 7.

In a further variant, the central group can comprise a unit 13 capable of acting both as heating unit and as cooling unit for the carrier fluid and hence active on a single delivery line which supplies the distribution circuit and thus the various service lines selectively with hot carrier fluid or with cold carrier fluid through the intervention of suitable valve systems, per se known.

In addition, it is possible to arrange multiple thermal exchange units 7 in series on a single line 5.

Returning now to the description of the exemplifying plant shown in FIG. 1, such figure schematically shows a non-limiting configuration of the invention in which each return line 4 in fluid communication with the delivery line 3 to define a circuit 2 for distributing the carrier fluid of closed loop type in which the carrier fluid (or the different carrier fluids if multiple delivery lines and multiple return lines are used) is made to recirculate within the distribution circuit 2.

In one configuration (see always FIG. 1, but the same aspects may be present in the plant of FIG. 9), the plant 1 may optionally be provided with a supply line 27, in fluid communication with the delivery line 3 and/or the return line 4, configured for allowing the addition (reintegration) of carrier fluid in the circuit 2 and an outlet line 28, in fluid communication with the delivery line 3 and/or with the return line 4, configured for allowing the discharge of carrier fluid from the circuit 2 (for example for washing operations). On each of said supply and outlet lines 27, 28, a closure valve may be advantageously arranged (such element not illustrated in the enclosed figures), for example a ball valve or a simple "open and close" tap, configured for opening and closing the lines 27 and 28 and thus allowing the introduction of fresh carrier fluid and the discharge of used carrier fluid from the circuit 2.

As is visible in FIG. 1, the plant 1 provides for at least one central thermal treatment group 6, comprising at least one pump 12 and at least one cooling and/or heating unit 13. The central group 6 is connected to the delivery line 3 of the circuit 2 and configured for varying at least one between temperature and flow rate of the carrier fluid in the delivery line 3. The thermal treatment group 6 is generally placed between the delivery line(s) 3 and the return line(s) 4 so as to supply the delivery line(s) and receive the return fluid coming from the return lines. The pump 12 is configured for facilitating sending of the carrier fluid to the delivery line(s) and hence to the service lines 5. FIG. 1 schematically shows a configuration of the plant 1 having only one central thermal treatment group 6; it is nevertheless possible to provide for a plurality of groups 6 arranged in series or parallel on the delivery line 3 or directly active on a service line 5 or arranged as in FIG. 9.

As briefly mentioned above, each circuit 2 (i.e. both the circuit 2 of the plant of FIG. 1 and each circuit 2 in FIG. 9) comprises a plurality of service lines 5; for each service line 5, the plant 1 comprises at least one exchange unit 7 configured for serving a respective environment to be air conditioned and/or heated. Each thermal exchange unit 7 (utility device) may comprise at least one from among:

- a fan convector, having a hydraulic side traversed by the carrier fluid and a pneumatic side traversed by air which is exchanged with the environment to be climate-controlled or heated; the fan convector may for example have at least one fan as thermal exchange modulator 7a;
- a thermal convector, for example with a fan as thermal exchange modulator 7a;
- a heat exchanger, for example with adjustable thermal exchange surface acting as thermal exchange modulator 7a;
- a fixed exchanger, such as for example a classic radiator or a radiant panel lacking fans or adjustable surfaces.

The thermal exchange unit can also be part of a UTA (air treatment unit): in this case, multiple thermal treatment units 7 may be associated with a UTA and have a respective hydraulic side in which a separate carrier fluid circulates (for example the units 7 may be part of two separate distribution circuits 2, one with heating fluid and one with coaling fluid which can be selectively used in order to treat the air of the UTA). The UTA has at least one air distribution circuit which serves the various environments to be air conditioned/heated and which is connected to the pneumatic side of the various thermal treatment units (for example as shown in FIG. 9 where the pneumatic side of two units 7 is part of the air distribution circuit of the UTA). The UTA may also have for example at least one fan operating on the pneumatic circuit as thermal exchange modulator 7a.

In FIG. 1, cases are shown in which each line 5 and each thermal exchange unit 7 arranged on such line 5 directly serve a respective environment to be air conditioned. In FIG. 9, each circuit 2 provides for both one or more lines 5 which serve a respective unit 7 and hence a respective environment, and the case in which two or more lines 5 are in reality part of a UTA (air treatment unit) 77 and thus serve at least one air distribution line 70, on which one or more thermal exchange modulators 7a, for example constituted by one or more fans, may operate.

Figure 2:
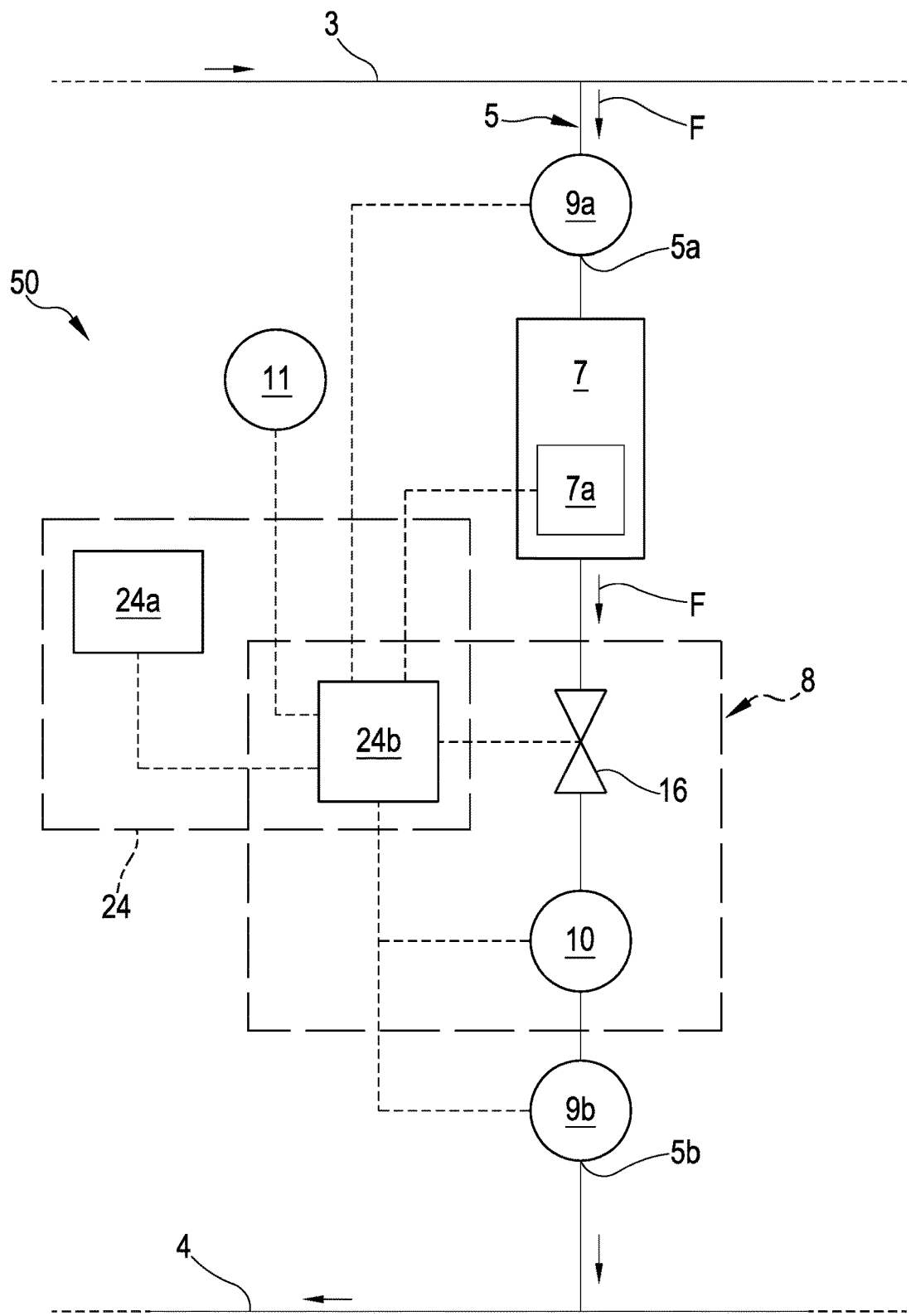
FIGS. 2 to 4 are respective schematic representations of embodiment variants of a service line of a plant in accordance with the present invention.
Figure 3:
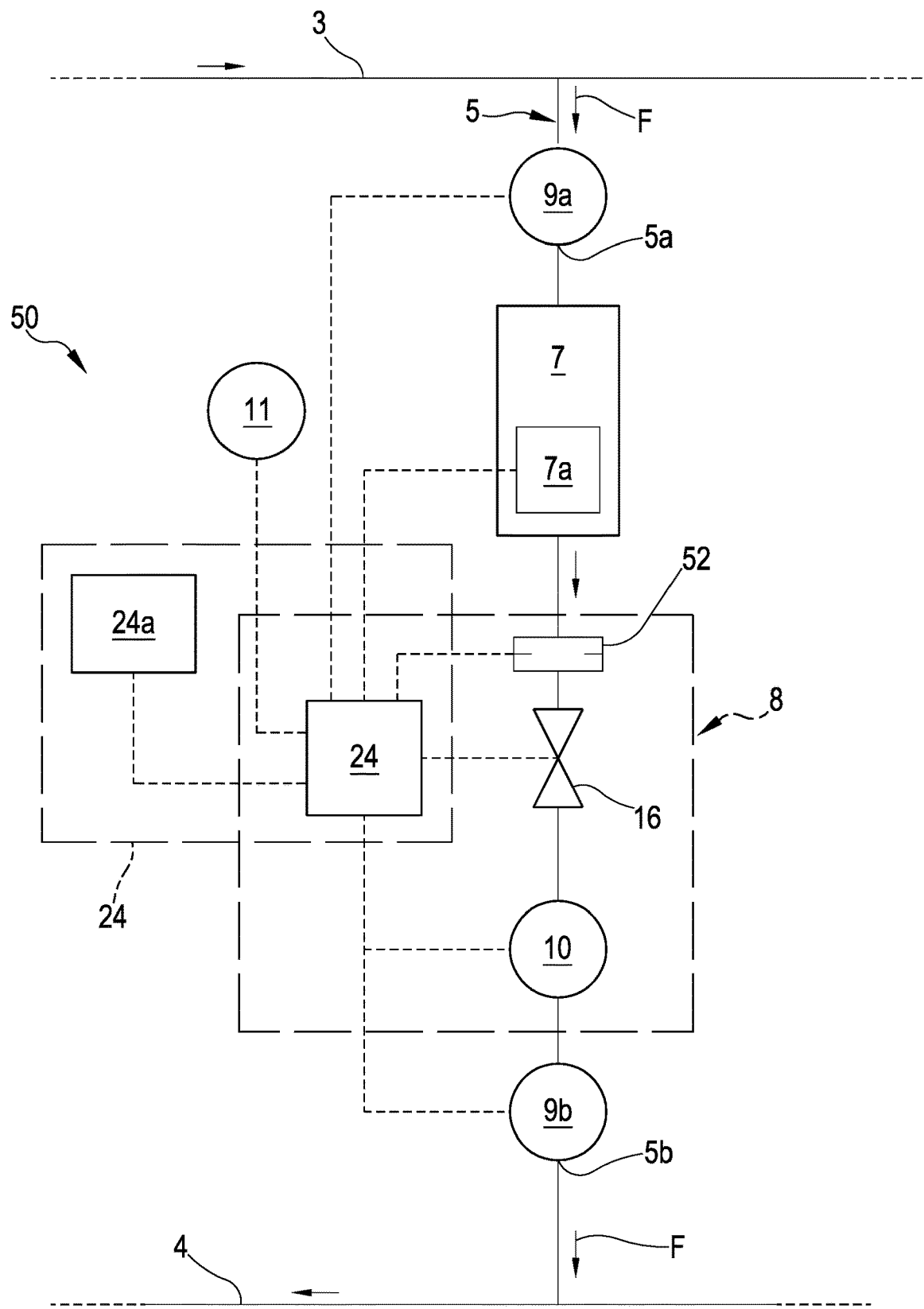
Figure 4:
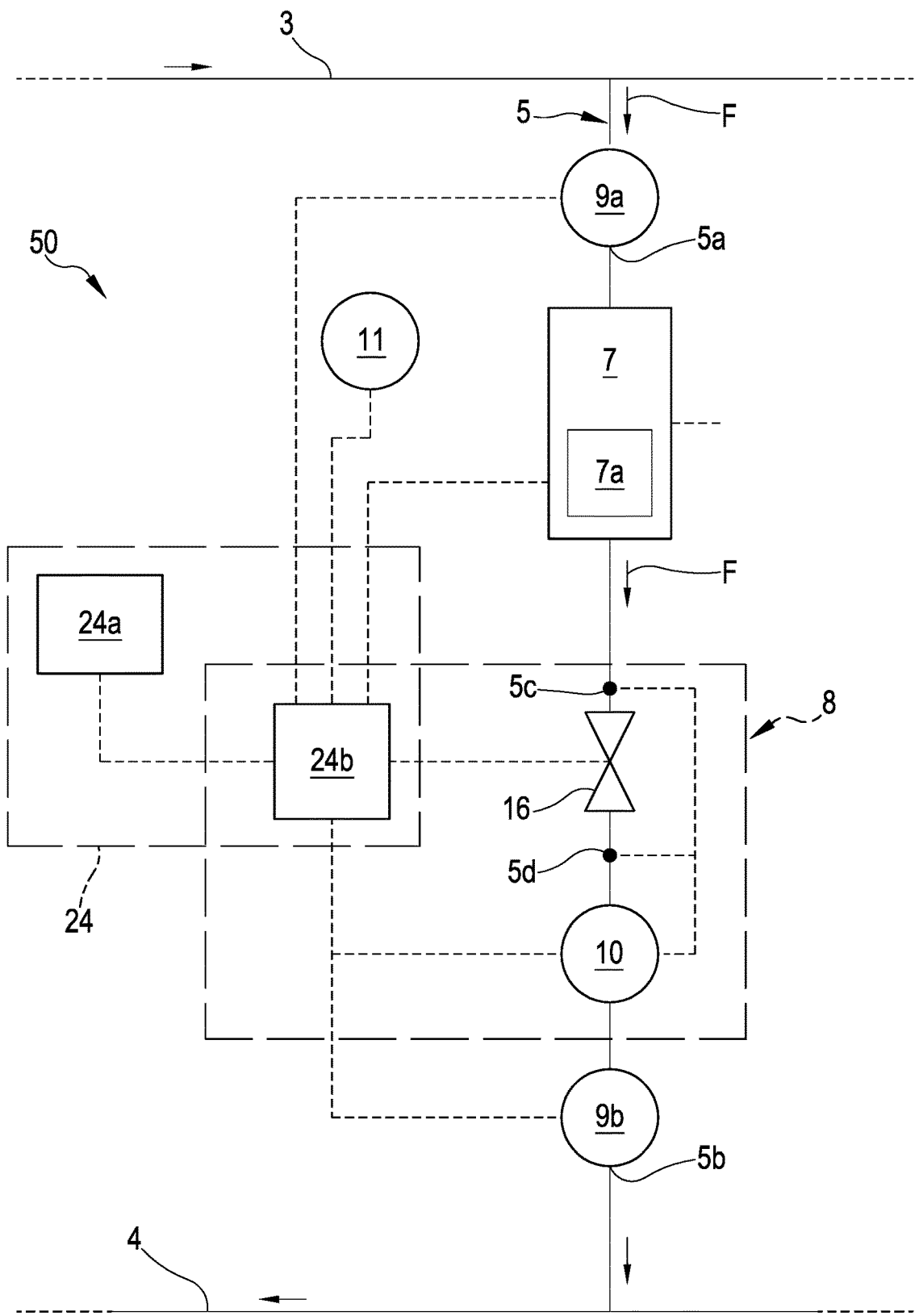

Leaving now the overall scheme of the plant 1 and entering into more detail to describe the structure of each service line 5, and with reference to the examples pursuant to FIGS. 2-4, each service line 5 provides for the use of a device, indicated overall with 50, having monitoring and/or control functions. The device 50 has at least one flow rate regulator 8 configured for managing the quantity of carrier fluid (mass flow rate) passing through the respective service line 5. With reference to the fluid circulation direction (see arrows F in FIGS. 2-4), the flow rate regulator 8 may be arranged on the service line 5 downstream of the thermal exchange unit 7 operating on the same service line 5.

In more detail, the flow rate regulator 8 comprises a valve 16 have a valve body 16a having at least one inlet 17, one outlet 18 and a passage 19 that places the inlet 17 in fluid communication with the outlet 18. The valve body 16a has, at the inlet 17 and at the outlet 18 of the valve 16, respective connection members 29, 30 (FIG. 5) adapted to allow the fixing of the valve 16 on the circuit 2. The connection members 29, 30 may for example be threads or quick attachments or connections of still another type.

Figure 5:
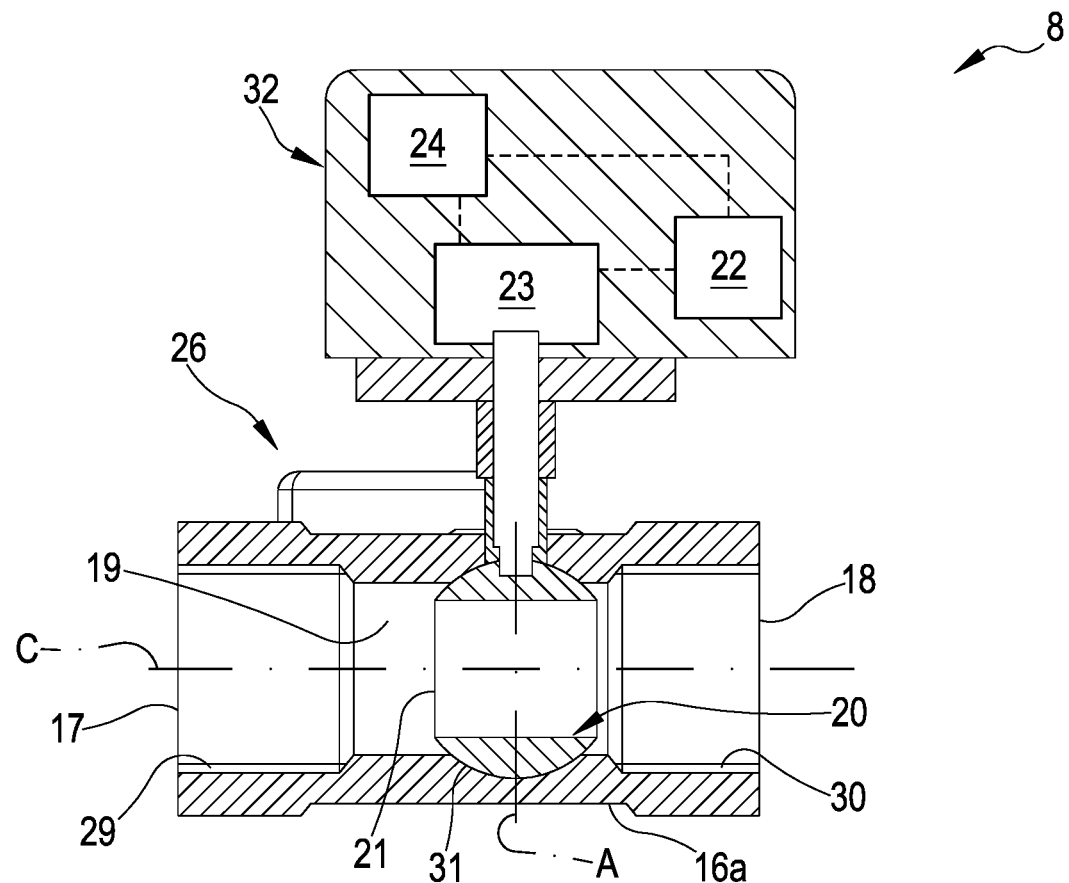
FIG. 5 is a sectional view of a valve usable as flow rate regulator in a service line of an air conditioning and/or heating plant in accordance with the present invention.

The passage 19 has a seat 31 adapted to house an interception element 20 which has the task of partially or totally intercepting the fluid traversing the valve and is thus capable of acting as regulator of flow rate or even as element for closing the passage 19; the interception element, in cooperation with the valve body 16a, defines a fluid passage opening 21 of width that is variable as a function of positions assumed by the interception element 20 relative to the valve body 16a. The interception element 20 is configured for acting along a predetermined operating travel, which comprises a plurality of operating positions that are separate and angularly or translationally offset from each other. The movement of the interception element 20 may thus be rotary or translational. In the first case, the movement occurs via rotation according to an angle of movement around a rotation axis A which is extended transverse to a main extension axis C of the channel 19 (FIG. 5). In the second case, the movement may occur according to a rectilinear direction (configuration not illustrated). If the interception element 20 executes a rotary movement, the interception element 20 has an external surface of substantially spherical or cylindrical geometry, as can be observed in FIG. 5.

The valve 16 also comprises an actuator member 23 connected with the valve body 16a and active on the interception element 20 in order to move the latter at least between a completely opening position, in which the passage opening 21 has maximum area, and a closed position, in which the passage opening 21 is closed. The actuator may also position the interception member in a plurality of intermediate positions between the open position and the closed position, therefore allowing regulating the flow rate traversing the service line 5. In more detail, the actuator member 23 may comprise an actuator of electrical or mechanical type, possibly provided with a suitable reduction group, carried by the valve body 16a and engaged with the interception element 20.

The flow rate regulator 8 may also comprise at least one position sensor 22 configured for determining the positions assumed by the interception element 20, along a predetermined operating travel relative to the valve body 16a, and transmitting a respective signal which thus allows knowing the degree of opening of each valve 16. In a non-limiting embodiment of the invention, the interception element 20 is configured for assuming a plurality of positions along said operating travel corresponding to different degrees of opening of said passage opening 21: the position sensor 22 may for example comprise an encoder, a potentiometer, or another means configured for emitting a signal which allows determining or which signals the position of the interception member along the operating travel. For example, the position sensor 22 may be on figured to emit a signal with each pitch of predetermined size completed by the interception element 20 along the operating travel, or to emit a signal with amplitude or frequency which is a function of the position of the interception element along the operating travel.

In a non-limiting embodiment of the invention, the flow rate regulator 8 also comprises a control unit 24 connected with the position sensor 22 and active on the actuator member 23. The control unit 24 is configured for receiving the signal from the position sensor 22, processing said signal in order to establish the relative position of the interception element 20 with respect to the valve body 16a. The control unit 24 may also be configured for driving the actuator 23, in particular for moving the interception element 20 in a controlled manner. The connection by means of the control unit 24 to the sensor 22 and to the actuator member 23 allows the unit 24 to manage and control the movement of the interception element 20. In practice, the control unit 24 may comprise one or more microprocessors programmed to receive the signal from the sensor 22 in inlet, then establishing therefrom the actual position of each interception member and acting on the actuator member 23 as a function of such signal and of the desired position where it is desired to bring the interception element 20. Actuator member 23 and control unit 24 may be part of the valve 16 for example operating downstream of each thermal treatment unit 7 of the same service line 5 on which said valve 16 is active. In fact, in the example of FIG. 5, sensor 22, actuator member 23 and control unit 24 define a kind of driving head 32 stably carried by the valve body 16a which is adapted to monitor and control the interception element 20.

The device 50 and hence the plant 1 may comprise various sensors described hereinbelow. For example, for each service line 5, at least one thermal sensor 9, 9a, 9b may be provided that is configured for detecting a measured value of a thermal parameter dependent on the temperature difference between a first section 5a of a service line 5 upstream of said thermal exchange unit 7 and a second section 5b of the same service line 5 downstream of the thermal exchange unit 7. FIG. 1 illustrates, at the service line 5 extended horizontally, a first configuration of the thermal sensor 9 essentially comprising a single differential sensor connected with the first section 5a of a service line 5 upstream of the thermal exchange unit 7 and with the second section 5b of the same service line 5 downstream of the same thermal exchange unit 7: the differential sensor is configured for detecting the temperature difference between said first and said second section 5a, 5b of each service line 5. The differential sensor 9 may be physically in proximity to or on a point of the service line and has detection lines in fluid communication with the first and the second section 5a, 5b of the service line 5. As an alternative, the thermal sensor 9 may be carried by the flow rate regulator 8 and have a power plug at the regulator 8 itself, downstream of the unit 7, in addition to having a detection line in fluid communication with the first section 5a of the service line 5 upstream of the same unit 7.

In FIG. 1 (see the other service lines 5) and in FIG. 2, a second embodiment is instead illustrated in which the thermal sensor comprising a first thermal detector 9a configured for detecting the temperature in a first section 5a of a service line 5 upstream of the thermal exchange unit 7 and a second thermal detector 9b configured for detecting the temperature in a second section 5b of the same service line 5 downstream of the thermal exchange unit 7. In this second variant, the second detector 9b may be carried by the flow rate regulator 8 and in particular by the valve 16.

The thermal sensor 9, 9a, 9b may be connected with the control unit 24 of the flow rate regulator 8, which may be configured for processing the signal received by said thermal sensor and calculating the temperature difference between the abovementioned sections (first and second section 5a, 5b) upstream and downstream of the thermal exchange unit 7.

The device 50 and thus the plant 1 may also comprise, for each service line 5, at least one hydraulic sensor 10 configured for detecting (or allowing the determination with known formulas) the flow rate traversing each flow rate regulator 8. In one configuration of the plant 1, the hydraulic sensor 10 may comprise a flowmeter (case shown in FIG. 2), for example carried directly by the flow rate regulator 8, in particular directly by the valve 16, and configured for detecting the flow rate traversing the regulator 8.

As an alternative, the hydraulic sensor 10 may comprise a sensor capable of measuring a difference (or a ratio) of pressure between a first section 5c of a service line 5 upstream of said flow rate regulator 8 and a second section 5d of the same service line 5 downstream of the same flow rate regulator 8 (case shown in FIG. 4): knowing the position of the interception member and the mass flow rate/pressure drop characteristic curve of the valve 16, it is possible to obtain the flow rate from the measured value of the pressure difference. More in detail, the sensor 10 may measure for example a difference or a ratio between the actual pressure present in the section 5c and the current pressure in the section 5d, providing an output signal proportional to the difference or ratio between the pressures in the two abovementioned sections 5c, 5d. As is visible in FIG. 4, the first section 5c of the service line 5 may be arranged downstream of the thermal treatment unit 7. As an alternative, the first section 5c of the hydraulic sensor 10 may coincide with the first section 5a, i.e. be arranged upstream of the thermal treatment unit 7). The second section 5d is for example situated immediately downstream of the valve 16, or on the valve 16 and directly connected with the channel 19 of the valve 16. The first and the second section 5c and 5d could also both be located on the valve body of the valve 16 upstream and downstream of the interception element 20.

In a further alternative, the hydraulic sensor 10 may comprise a sensor capable of measuring the pressure in a section of a service line 5 immediately upstream and in a section immediately downstream of a calibrated orifice 52 (case illustrated in FIG. 3), i.e. the differential pressure between the two points immediately upstream and downstream of the calibrated orifice 52: the calibrated orifice is preferably placed upstream of the flow rate regulator so as to not be subjected to the interference thereof; knowing the characteristic mass flow rate/pressure drop of the orifice, it is possible to determine the mass flow rate through the same.

Indeed, the sensor 10 may in all of the above-described cases comprise a differential pressure sensor 26 which receives in inlet a first and a second pressure signal and at the outlet generates a differential signal from which it is possible to calculate the flow rate.

As an alternative to using a differential sensor, it is possible to have a configuration in which the sensor 10 comprises a first detector and a second detector in fluid connection with the respective sections as described above of the same service line 5.

Even if in the figures the hydraulic sensor 10 is placed downstream of the thermal exchange unit 7, such sensor 10 could be installed upstream of the thermal exchange unit 7 and possibly be physically connected to the first thermal detector 9a. In this case, the valve 16 may be physically connected with the second thermal detector 9b and operate downstream of the unit 7.

The hydraulic sensor 10 may be connected to the control unit 24 of the flow rate regulator 8; the control unit 24 is in such case configured for receiving the signal from said hydraulic sensor 10 and calculating the mass flow rate passing through the same. For example, the control unit 24 is configured for determining the actual value of mass flow rate traversing the regulator 8 on the basis of the difference between the values of the pressure parameter measured in the first and in the second section 5c and 5d by the sensor 10.

The hydraulic sensor or flow rate sensor 10 (and in the pressure sensors if present) may be positioned downstream the second cross section of the respective service line (5)

(see e.g., FIG. 1) or upstream the first section of each service line (5) (example not shown) or between the first and second section of the same service line 5 (FIGS. 2 to 4). It should be noted that at a same detection time, the flow rate in a same service line is basically the same if the carrier fluid is a liquid and is substantially the same (a part from transitory intervals) if the carrier fluid is a gas.

As is also illustrated in FIGS. 2-4, the device 50 and hence the plant 1 may also comprise an environment temperature sensor 11 intended to operate at each of the environments served by the thermal exchange units 7. The sensor 11 may be connected with the control unit 24 of the flow rate regulator 8; the control unit 24 in such case may be configured for receiving the signal from the sensor 11 and calculating or reading the temperature at the environment in which the thermal treatment unit 7 operates. The control unit 24 may also be configured for acting on the degree of opening of the valve 16 and/or on the thermal exchange modulator 7a present in each thermal exchange unit so as to regulate the thermal exchange modulator 7a (for example a fan) as a function of the temperature detected by the sensor 11 and of a desired temperature in the environment where the sensor 11 operates.

The device 50 and the plant 1 may finally comprise, for each of said lines 5, at least one partial or total closure member (configuration not illustrated in the enclosed figures). The closure members may be positioned at the start or at the end of each service line 5, respectively upstream or downstream of each element (sensors, thermal treatment units, regulators) active on the same service line 5. In more detail, each closure member may comprise an on/off valve which closes or opens the supply of each service line 5: in this manner, the closure members can exclude or not exclude a service line 5 and for example interrupt the thermal treatment of an environment for maintenance activity or the like.

Even if, in the preceding description, the case of a control unit 24 present on each valve 16 was described, the control unit 24 may alternatively have central controller (i.e., a component that is part of the plant, but not necessarily part of each device 50 associated with each line 5) connected to the environment temperature sensors 11, to the temperature sensors of the carrier fluid 9, 9a, 9b, to the flow rate sensors 10, to the valves 16, to the modulators 7a, in order to centrally perform the above-described functions for all or for a predetermined number of service lines 5. In a further alternative, the controller 24 may be separated from the single devices 50 and dedicated to control a predetermined group of lines 5: in other words, the plant 1 may comprise a plurality of control unit 24, each dedicated for controlling a respective subgroup of service lines 5.

In a further alternative, shown in FIGS. 2-4, the control unit may comprise both local units 24b, each mounted on a respective valve, and one or more central units 24a connected with the local units 24b: in this case, the described functions may be in part executed by the central unit and in part executed by the peripheral units under the control of the central unit.

In any case, the unit or the control units 24 may also be connected and active on the thermal treatment central group(s) 6.

The control unit(s) 24 are also configured for executing the processes described and/or claimed hereinbelow.
Monitoring and/or Control Processes With reference to the device 50 active on each line 5 and to the air conditioning and/or heating plant 1 described above, a process for monitoring, and possibly also controlling, the plant 1 is now described, which provides for executing—for at least one of the service lines 5 (preferably for a plurality thereof or even for all of them)—the steps described hereinbelow. In describing the process, reference will now be made to FIG. 6.

First of all, the carrier fluid is made to reach and circulate through at least one service line (step A in FIG. 6): for example, the carrier fluid may traverse a plurality of service lines 5 simultaneously. In traversing each service line 5, each carrier fluid traversing at a first instant t1 the first section 5a of the service line 5, upstream of the thermal exchange unit 7, will subsequently traverse the second section 5b of the same service line placed downstream of the thermal exchange unit 7 at a second instant t2, with a hydraulic delay dt given by the time necessary for the same fluid particle to pass from the first to the second section. The hydraulic delay dt depends on the volume of carrier fluid present between the first and the second section (indicated as control volume V0), as well as by the flow rate or flow rate of the carrier fluid. Given the typical dimensions of the conduits and of the exchangers, given the average flow rates typically present, and having considered that the first and the second section are the sections where the temperature sensors are present (for example 9a and 9b), the hydraulic delay dt can typically be tens of seconds or even several minutes. From an operating standpoint, the hydraulic delay could be known information or it could be calculated on the basis of an average reference value of the carrier fluid flow rate and of the internal volume (Vi) of the conduit between the first and the second section 5a, 5b (for example, assigning to V0 the value of Vi); alternatively, the process may provide for an actual determination of the hydraulic delay (step B in FIG. 6) carried out by estimating the control volume V0 (volume of carrier fluid between the first and the second section 5a, 5b) as described hereinbelow and then determining the hydraulic delay dt (or directly the second instant t2 at which a same fluid particle which traversed the first section 5a reaches the second section 5b) as a function of the control volume V0 and of the carrier fluid flow rate $\varphi$ traversing the service line 5. The determination of the control volume V0 may comprise the following steps which are for example executed before the actual operative use of the plant 1, for example in a step of calibration or initialization of the plant:

measuring a temperature of the carrier fluid at the first section and at the second section; in practice, the temperature at the first section and at the second section are continuously monitored or monitored at regular intervals, sufficiently close together in order to immediately detect any variation thereof;

varying the temperature of the carrier fluid entering said service line;

identifying an initial instant (ts) in which the temperature of the carrier fluid at the first section varies; this may be made in various ways, for example by verifying if the derivative of the temperature profile at the first section is greater than a pre-established reference, or if the temperature at the first section exceeds a predetermined threshold, or if the temperature variation at the first section varies beyond a certain limit between two successive instants or with respect to a baseline;

identifying a final instant (tf) in which the temperature of the carrier fluid at the second section varies, optionally beyond a predetermined threshold; analogous to the preceding step, and this step may be concretely executed in various ways, for example by verifying if the derivative of the temperature profile at the second section is greater than a pre-established reference, or if the temperature at the second section exceeds a predetermined threshold, or if the temperature variation at the second section varies beyond a certain limit between two successive instants or with respect to a baseline;

measuring values of the carrier fluid flow rate φ(t) during the time interval comprised between the initial instant ts and the final instant tf; in practice one may measure the progression over time of the flow rate so to be able to determine, via interpolation, the function of the flow rate over time or have a sufficiently high number of values of the flow rate in the time span of interest;

calculating the control volume (V0) on the basis of the values assumed by the carrier fluid flow rate in the interval between the initial instant ts and the final instant tf.

More precisely the process may provide for calculating the control volume (V0) on the basis of the values assumed by the carrier fluid flow rate in the interval between the initial instant ts and the final instant tf by using the following formula:

$$\int_{ts}^{tf}(\varphi(t))dt = V0$$

in which:
φ(t) represents the value over time of the carrier fluid flow rate which traverses the line 5 and hence the thermal exchange unit 7,
ts is the initial instant,
tf is the find instant.

As already stated above, once the volume V0 is known (i.e., calculated or per se pre-known), it is possible to precisely determine the hydraulic delay dt or directly the second instant t2 (at which a same fluid particle that has traversed the first section 5a at the first instant traverses the second section 5b) as a function of the control volume V0 and of the carrier fluid flow rate φ traversing the service line 5. For example, by continuously measuring the flow rate traversing the service line, one may progressively record the volume that traverses the first section of the same service line and therefore determine when a volume V0 of fluid has traversed such first section, thereby knowing when the measurement of the temperature in the second section should take place.

As the carrier fluid circulates through the service line 5, the process provides for executing, and repeating a plurality of times, a cycle (C in FIG. 6) in order to collect a plurality of pairs or of sets of three values of the parameters described hereinbelow, which will then serve in determining one or more characteristic functions of the thermal exchange unit present in the service line in question.

The cycle C comprises in particular the following substeps:
a) determining (substep C1 which can make use of the temperature sensors 9a and 9b described above) at least one value of the temperature difference ΔT between the temperature $T_1$ of the carrier fluid measured at the first section 5a and detected at a first instant t1, and the temperature of the carrier fluid $T_2$ measured at the second section 5b and detected at a second instant t2; as already stated above, the second instant follows said hydraulic delay dt with respect to the first instant t1 or said in other words t2=t1+dt, with t2 being the moment at which the measurement of the temperature $T_2$ is carried out, as illustrated above;
b) detecting (substep C2 which may use of the above-described hydraulic sensor 10) the value φ of the carrier fluid flow rate traversing the thermal exchange unit 7, in which the measurement of such flow rate occurs at a detection instant, which is t1 or t2 or a tm subsequent to the first instant t1 and prior to the second instant t2.

In practice, in each cycle C, at least two values are obtained: the value of the abovementioned temperature difference ΔT and the corresponding value of the carrier fluid flow rate φ, for example at the instant t1, t2 or tm; it should be observed, since the temperature difference ΔT is determined with detections made in the first and in the second section at different instants, that such temperature difference accounts for the hydraulic delay and is actually deriving from the thermal exchange attained by the thermal exchange unit 7; in other words, the temperature difference ΔT determined in the described manner is not affected by possible transients due to oscillations on the temperature of the fluid in the delivery line or entering the thermal exchange unit since, as stated above, the temperature difference ΔT is measured at different instants so as to detect the thermal gradient on the same fluid particle; in addition, the carrier fluid flow rate is preferably detected either at t1 (so as to immediately get its value) or at an intermediate instant tm between t1 and t2, or tm=t1+dt/2, so as to minimize possible oscillations of flow rate during the interval dt.

In accordance with one aspect of the finding, the process provides for monitoring the temperature as described above and hence for driving the central thermal treatment group 6 and/or the flow rate regulator as a function of the temperature difference ΔT as measured above (in each cycle or by using pairs or sets of three values coming from multiple consecutive cycles), as well as of a desired value of an operating parameter. For example, in accordance with one aspect of the invention, a control process is provided, which provides for receiving at least one desired value of an operating parameter comprising one from among:
thermal power exchanged by the carrier fluid in the passage through each thermal exchange unit 7,
heat exchanged by the carrier fluid in a predetermined time interval in the passage through each thermal exchange unit 7,
temperature difference as determined above.

It should be observed that the desired value of each of the abovementioned parameters may be:
a set value (for example set by a user or by a technician or present in a memory accessible by the control unit 24, 24a, 24b),
or calculated by the process as a function of a desired temperature in the environment in which each thermal exchange unit is installed by using known formulas and in any case not the object of the present finding (this is the case when the thermal exchange units do not have an actual air circulation channel),
or a value calculated as a function of a desired value of the temperature of air entering the thermal exchange unit (case in which one uses a thermal exchange unit with an actual air circulation channel, such as for example a fan convector or a UTA).

In other words, the process may receive a desired value of the temperature which is desired in the environment served by the thermal treatment unit or in the air circulated by the fan convector or by the UTA with which the thermal treatment unit is associated: from this desired temperature value and from the temperature actually present in the environment (or in the air circulated by the UTA or by the fan convector), the process may then establish the value at which the operating parameter will be set, i.e. the desired value of the thermal power exchanged or of the heat exchanged by the carrier fluid in traversing the unit 7, or the desired thermal gradient astride the thermal exchange unit.

The process then provides for determining, for each thermal exchange unit (7), an actual value of said operating parameter by using the measurement of the temperature difference between the first section at the instant t1 and the second section at the instant t2 (and in the case of thermal power and exchanged heat, also the value of the carrier fluid flow rate traversing the line 5 in question and hence the thermal exchange unit 7).

Hence the process provides for comparing the desired value of the operating parameter with the corresponding actual value of the same operating parameter, and if following said comparison step it results that, for at least one thermal exchange unit 7, the actual value of the operating parameter is shifted by more than a predetermined threshold from the desired value of the same operating parameter, carrying out a control step aimed to align or reduce the difference between the actual value and the desired value of the operating parameter. The control step may comprise for example at least one between:
- driving the central thermal treatment group 6 for regulating at least one general parameter selected from among: hydraulic head or flow rate set for the carrier fluid traversing the central group, heating set for the carrier fluid traversing the central group, cooling set for the carrier fluid traversing the central group,
- driving the flow rate regulator 8 present on the channel 5 of the thermal exchange unit 7.

In practice, due to the particular new mode of determining the temperature difference that is not obtained with synchronous thermal detections, but rather as described above, the temperature difference between upstream and downstream of the exchanger is cleaned of possible transients on the delivery line and hence also the consequent control actions only intervene when this is actually necessary so as to reach the target set as desired value of the operating parameter that one is controlling (whether this is power or exchanged heat or temperature difference astride the unit 7 or temperature to be reached in an environment), preventing interventions for mere transient oscillations in the temperature and/or in the delivery flow rate.

In one variant, the cycle also comprises a substep of stability verification (substep C4) of the flow rate of the carrier fluid: this substep serves in practice to establish if the flow rate or flow rate of carrier fluid is sufficiently constant in order to then discard the pairs of values of temperature difference and of carrier fluid flow rate collected in a specific cycle if the stability verification has not given a positive outcome. In this manner, the process described herein will not use, for the step of determining the characteristic functions, the pairs of values of temperature difference ΔT and of carrier fluid flow rate φ obtained in cycles where the stability verification did not have a positive outcome. The substep of stability verification comprises for example:
- determining a reference flow rate $\varphi_r$ as the ratio between the control volume V0 and the hydraulic delay (dt=t2−t1),
- comparing the carrier fluid flow rate φ measured in each cycle at the instant t1 or t2 or tm with the reference flow rate $\varphi_r$,
- establishing that the stability verification has a positive outcome if the difference between reference flow rate $\varphi_r$ and carrier fluid flow rate φ is lower than a predetermined threshold S.

As an example, the following formula can be used:

$$\left| \frac{\frac{Vo}{t2-t1} - \varphi}{\varphi} \right| \leq S$$

in which S=10% or 5% or another relatively small percentage (the smaller the percentage, the greater the requested flow rate stability in order to validate the pairs of values collected with each cycle).

In accordance with a further aspect of the finding, the values of the abovementioned temperature difference ΔT and the corresponding value of the carrier fluid flow rate φ at the instant t1 or t2 or tm obtained in each cycle may then be used for determining characteristic functions which estimate the progression of operating parameters of the thermal exchange unit (primarily of the temperature difference and of the thermal power exchanged). For this purpose, after having collected a multiplicity of pairs of values of temperature difference $\Delta T = T_{t1} - T_{t2}$ and of carrier fluid flow rate φ obtained with respective cycles, possibly cleaned of the pairs relative to cycles where the abovementioned stability verification did not have a successful outcome, the process may determine one or both of the following functions (step D in FIG. 6):
- a characteristic function which relates the temperature difference ΔT between the first and the second section with the value of the carrier fluid flow rate φ,
- a characteristic function which relates a thermal power exchanged dQ/dt by the thermal exchange unit with the value of the carrier fluid flow rate φ.

For example, by interpolating the values of the temperature difference and of the carrier fluid flow rate of said plurality of pairs of values, one may determine the characteristic function which relates the temperature difference ΔT between the first and the second section with the value of the carrier fluid flow rate φ (as already stated above, relative at the instant tm).

In addition, the process may provide that with each cycle, the further substep (substep C3) is carried out for determining the thermal power exchanged dQ/dt by the thermal exchange unit, on the basis of the value of the carrier fluid flow rate φ at the instant tm traversing the thermal exchange unit 7 and of the temperature difference $\Delta T = T_{t1} - T_{t2}$, by using the following relation (where $C_p$ is the specific heat of the carrier fluid at constant pressure and where ρ is the density of the carrier fluid):

$$\frac{dQ}{dt} = (Cp) \cdot (\varphi) \cdot (\Delta T)$$

In this manner, with each cycle, a set of three values will in reality be obtained comprising the value of said temperature difference ΔT, the value of the carrier fluid flow rate φ and the corresponding value of said thermal power exchanged dQ/dt by the thermal exchange unit. At this point, by using in particular the pairs of values of thermal power and of flow rate of the carrier fluid obtained with each cycle, the process may determine the characteristic function of the thermal exchange unit present in said service line which relates the thermal power exchanged with the value of the carrier fluid flow rate. In particular, the step of determining the characteristic function of the exchanger is executed with techniques of interpolation or curve fitting, per se known, by using the values of the thermal power exchanged dQ/dt and of the carrier fluid flow rate φ. The shape of the characteristic function can be selected from among parameter curves of various nature, for example polynomial curves of the second or of the third or of the fourth order whose parameters can be determined by setting the parameter curve to 'pass' by or 'approximate' the pairs of values dQ/dt, φ mentioned above.

Once the relative characteristic function at a certain service line is obtained, such characteristic can be used both for monitoring the plant and for controlling, as will be clarified hereinbelow.

In accordance with a further aspect, the applicant has identified a type of parameter curve that can effectively represent the characteristic function of thermal power exchanged dQ/dt as a function of the carrier fluid flow rate φ. The type of curve identified has the double advantage of being simple and, with a proper determination of the parameters, of suitably representing thermal exchange units that are also different from each other, for example fan convectors, thermal convectors, radiators, UTA. This aspect of the invention may be combined with the above-described process of determining the values of flow rate of the carrier fluid, of temperature difference and of thermal power by using detections of flow rate and of temperature carried out at very different instants, or it can also have use in systems where the characteristic function of the thermal exchange units uses pairs of values of temperature difference, flow rate and thermal power that are synchronous or measured as conventionally occurs, at the same instant.

In more detail, the characteristic function of the thermal exchange unit present in said service line which relates the thermal power exchanged with the value of the carrier fluid flow rate is an exponential curve of type:

$$\frac{dQ}{dt} = A * \left(1 - e^{-\left(\frac{\varphi}{\varphi 0}\right)}\right)$$

where:
A and $\varphi_0$ are obtained with techniques of curve fitting and/or interpolation, approximating the pairs of values of flow rate of the carrier fluid (φ) and of the thermal power (dQ/dt) obtained with each cycle, and
φ is the flow rate of the carrier fluid entering the thermal exchange unit.

For example, in one possible solution, the exponential curve is:

$$\frac{dQ}{dt} = \left[a_1 \cdot |T_{t1} - T_{air,t1}|^n + a_2 \cdot \left(1 - \text{Min}\left(1, \frac{T_{air,t1} - T_{db,air,t1}}{T_{air,t1} - T_{t1}}\right)\right)^n\right] \cdot (1 - e^{-(\varphi/\varphi 0)})$$

where:

$$A = \left[a_1 \cdot |T_{t1} - T_{air,t1}|^n + a_2 \cdot \left(1 - \text{Min}\left(1, \frac{T_{air,t1} - T_{db,air,t1}}{T_{air,t1} - T_{t1}}\right)\right)^n\right]$$

and where:
dQ/dt represents the thermal power [kW] exchanged by the specific thermal exchange unit,
φ is the flow rate of the carrier fluid [kg/h] entering the thermal exchange unit, $T_{t1}$: Temperature [° C.] of the carrier fluid entering the thermal exchange unit, i.e. at the first section at the instant t1;

$T_{air,t1}$: Temperature [° C.] of the air present in the environment where the thermal exchange unit operates or of the air entering the thermal exchange unit at the instant t1; the selection depends on the type of unit 7 i.e. if such unit has an air circulation conduit or not: in the absence of such conduit, such as in the case of radiators, the ambient temperature is used, otherwise the temperature entering the unit 7;

$T_{db,air,t1}$: Dewpoint temperature [° C.] of the air present in the environment where the thermal exchange unit operates at the instant t1 or of the air entering the thermal exchange unit; the dewpoint temperature is determined with known formulas as a function of the temperature and relative humidity of the air present at the instant t1 in the environment where the thermal exchange unit operates or of the air entering the thermal exchange unit ($T_{air,t1}$, $RH_{air,t1}$).

Also in this case the selection of using the temperature relative to the environment or that entering the unit 7 depends on the type of unit 7, as indicated above.

It should be observed that a1, a2, n and φ0 are coefficients obtained with techniques of curve fitting and/or interpolation, approximating the pairs of values of flow rate of the carrier fluid φ and of the thermal power dQ/dt obtained with each cycle.

As an alternative, if one ignores the effect of condensation, the equation of the characteristic curve takes the following form, which in any case closely approximates most of the actual cases:

$$\frac{dQ}{dt} = [a_1 \cdot |T_{t1} - T_{air,t1}|^n] \cdot (1 - e^{-(\varphi/\varphi 0)})$$

where:

$A = [a_1 \cdot |T_{t1} - T_{air,t1}|^n]$ and where:
dQ/dt represents the thermal power [kW] exchanged by the specific thermal exchange unit,
φ is the flow rate of the carrier fluid [kg/h] entering the thermal exchange unit,
$T_{t1}$: Temperature [° C.] of the carrier fluid entering the thermal exchange unit, i.e. at the first section at the instant t1;
$T_{air,t1}$: Temperature [° C.] of the air present in the environment where the thermal exchange unit operates or of the air entering the thermal exchange unit at the instant t1;

It should be observed that a1, n and φ0 are coefficients obtained with techniques of curve fitting and/or interpolation, approximating the pairs of values of flow rate of the carrier fluid (φ) and of the thermal power (dQ/dt) obtained with each cycle.

The characteristic function(s) calculated by using the above-reported data and equations may be determined a plurality of times at time intervals spaced from each other, for example each week or each month, and stored in a suitable memory in order to have a historic record of the characteristic curves and hence a historic record of the behavior of each thermal exchange unit, hence without having to store an enormous number of actual measured data In accordance with an additional aspect, the process comprises determining an optimal field of operation of the thermal exchange unit by using the characteristic function, determined as described above.

Figure 6:
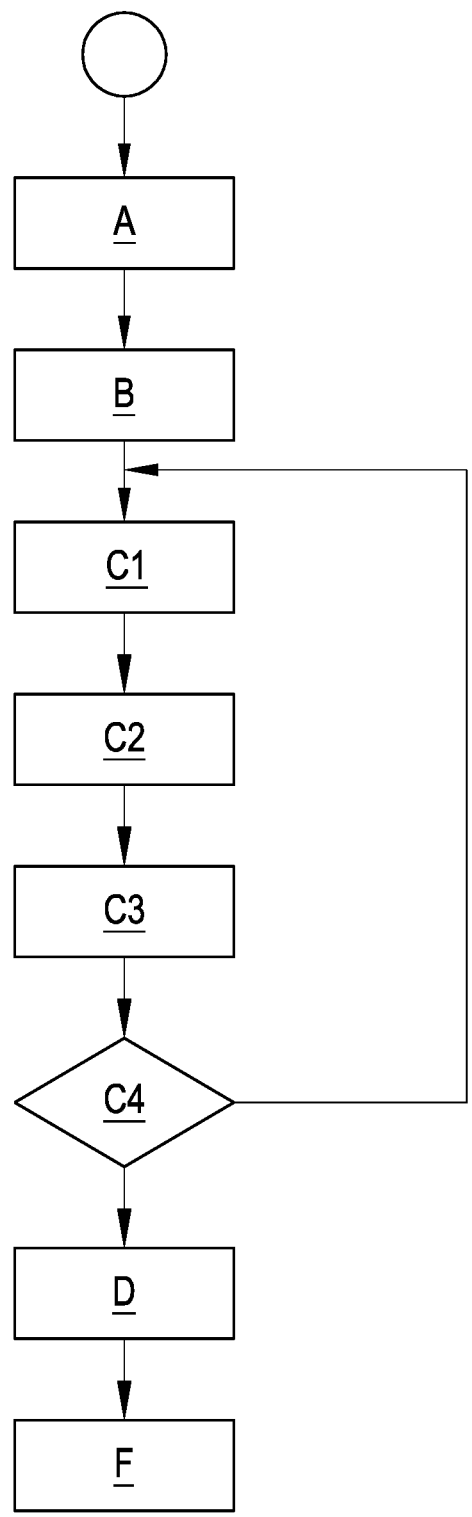
FIG. 6 is a flow diagram of a process for monitoring and/or controlling in accordance with aspects of the present invention.

In particular the process may comprise the definition of the optimal field of operation of the thermal exchange unit on the basis of the value of the coefficient $\varphi_0$ of said exponential curve (step F in FIG. 6).

For example, the process may determine, in particular delimit, the optimal field of operation of the thermal exchange unit by using the coefficient $\varphi_0$, setting the value of the carrier fluid flow rate such that it does not exceed K $\varphi_0$, where K is a multiplicative factor >1. The process may analogously provide for delimiting the optimal field of operation of the thermal exchange unit, setting the value of the carrier fluid flow rate such that it does not fall below K' $\varphi_0$, where K' is a multiplicative factor ≤K or alternatively ≤1. For example, it can be provided that the value of the carrier fluid flow rate does not exceed $3\varphi_0$ and that the value of the carrier fluid flow rate does not fall below $0.5\varphi_0$.

Figure 8:
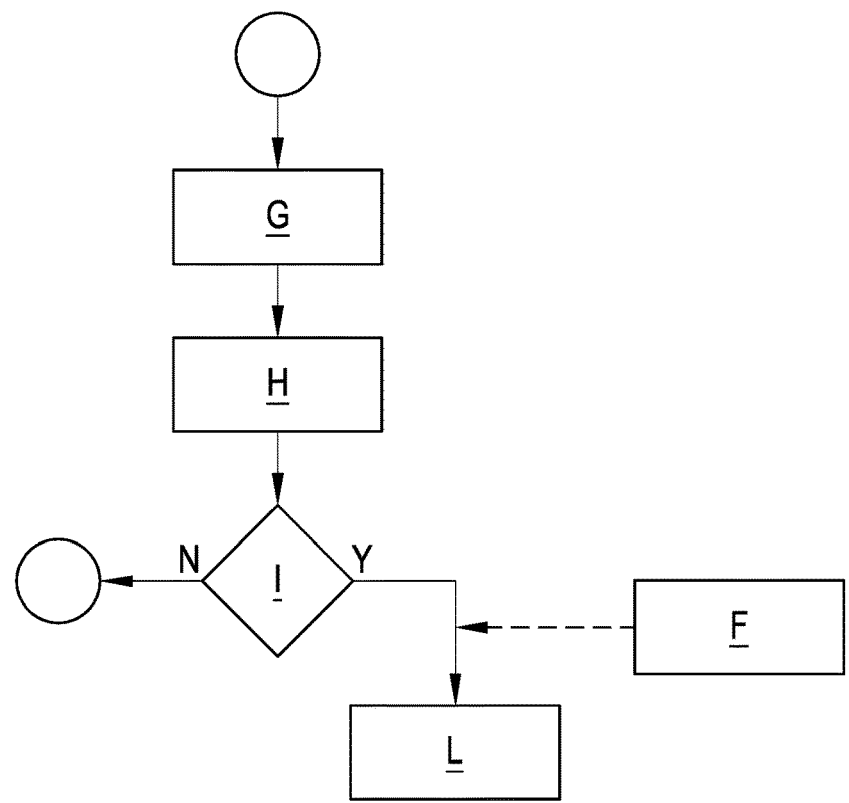
FIG. 8 is a flow diagram of a process of monitoring and/or controlling in accordance with further aspects of the present invention.

During the use of the plant, the process in accordance with the invention may therefore perform active control functions. In particular, as shown in the diagram of FIG. 8, the process may provide for the step G of receiving at least one desired value of an operating parameter comprising one from among:
thermal power exchanged by the carrier fluid in the passage through each thermal exchange unit 7,
heat exchanged by the carrier fluid in a predetermined time interval in the passage through each thermal exchange unit 7,
temperature difference as determined above.

As already stated above, the desired value of each of the abovementioned parameters may in turn be:
a set value (for example set by a user or by a technician or present in a memory accessible by the control unit 24, 24a, 24b),
or calculated by the process as a function of a desired temperature in the environment in which each thermal exchange unit is installed by using known formulas and in any case not the object of the present finding (this is the case when the thermal exchange units do not have an actual air circulation channel),
or a value calculated as a function of a desired value of the temperature of air entering the thermal exchange unit (case in which one uses a thermal exchange unit with an actual air circulation channel, such as for example a fan convector or a UTA).

The process may then determine (step H in FIG. 8), for each thermal exchange unit (7), an actual value of said operating parameter, and comparing (step 1) the desired value of the operating parameter with the actual value of the same operating parameter, intervening (step L) if there is an excessive discrepancy between the two. For example, if following the comparison step it results that, for at least one thermal exchange unit (7), the actual value of the operating parameter is shifted by more than a predetermined threshold from the desired value of the same operating parameter, the process may carry out at least one of the following control steps:
driving the central thermal treatment group (6) for regulating at least one general parameter selected from among: flow rate set for the carrier fluid, hydraulic head set for the carrier fluid traversing the central group, heating set for the carrier fluid traversing the central group, cooling set for the carrier fluid traversing the central group,
driving the flow rate regulator (8) present on the channel (5) of the thermal exchange unit (7).

Figure 7:
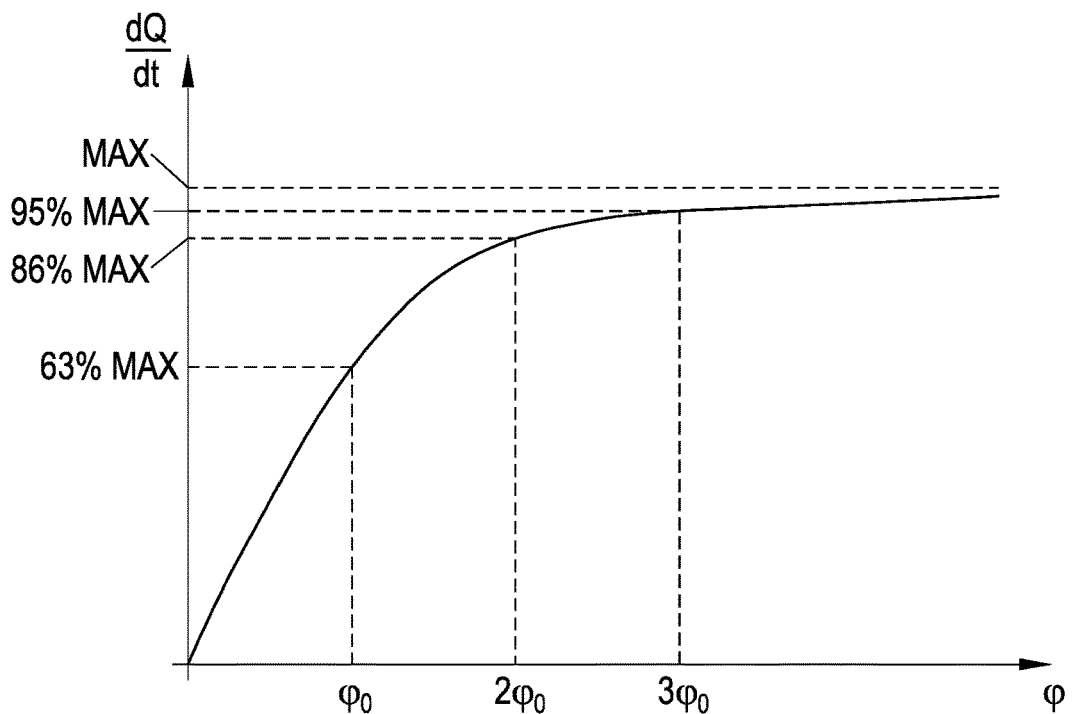
FIG. 7 is a Cartesian diagram representing a characteristic function, calculated in accordance with aspects of the invention, relative to a thermal exchange unit in a service line of an air conditioning and/or heating plant in accordance with the present invention; indicated on the x-axis is the flow rate of the carrier fluid traversing the thermal exchange unit and on the y-axis the thermal power delivered by the thermal exchange unit.

In accordance with one aspect of the invention the process provides for carrying out the control step(s) just described, nevertheless maintaining the flow rate of the carrier fluid traversing each thermal exchange unit within the respective optimal above-described field of operation (step F). For example, if it is established that the maximum acceptable flow rate must be no higher than $3\varphi_0$, consequently in the control of the flow rate regulator 8 or of the central unit 6, the process will in any case ensure that it does not exceed $3\varphi_0$. In other words, due to the previous determination of the characteristic function and to the particular exponential nature thereof, it is simple and intuitive to set operating limits on the flow rate during the various control steps. Moreover, it is observed (see FIG. 7) that by setting a maximum limit on the flow rate as a function of the coefficient $\varphi_0$, the exchanger is set to operate in an efficiency zone, since flow rates for example greater than $3\varphi_0$ would give very little gain in terms of exchanged power (against remarkable pressure drops, corresponding to considerable consumption of pumping energy).

The knowledge of the relative characteristic function at the thermal exchange unit also allows easily carrying out a procedure for identifying a malfunctioning condition of the same thermal exchange unit: for example by identifying a progressive deterioration of the same or sudden problems given by damage (for example the presence of a loss) or by an improper use of the unit (for example it can be verified that the exchange unit is inadvertently covered with a cloth or something else, preventing the efficient thermal exchange thereof).

In accordance with one aspect of the invention, the procedure for identifying a malfunctioning condition is executed at predetermined test instants during the operation of the plant, for example at regular time intervals or periodically. The procedure may be executed for one or more thermal exchange units: typically all of the thermal exchange units are periodically tested.

The procedure provides, for each thermal exchange unit, measuring at least one actual value of the carrier fluid flow rate traversing the thermal exchange unit itself.

In a first alternative, the procedure may then determine at least one actual value temperature difference $\Delta T$ or of thermal power exchanged by the carrier fluid in the passage through the thermal exchange unit 7 (by using the measurement of actual flow rate of the carrier fluid and measuring the thermal gradient $\Delta T$ between the first and the second section upstream and downstream of the thermal exchange unit).

In addition to the determination of said actual values, the procedure may provide for calculating, on the basis of the actual value measured of the carrier fluid flow rate, at least one corresponding calculated value of the thermal power exchanged by the carrier fluid in the passage through the thermal exchange unit 7 or a calculated value of the temperature difference $\Delta T$, by using one of the abovementioned characteristic functions. In practice, the calculated value of the thermal power (or the calculated value of the temperature difference $\Delta T$) represents a value which the thermal exchange unit must have in ideal conditions. The characteristic function used in that determined at a reference instant typically prior to that in which the flow rate of the carrier fluid is measured, such that the comparison occurs between one or more current actual values and one or more calculated values of the same parameter relative to a preceding time instant.

Then, the presence is determined of a malfunctioning condition of the exchanger on the basis of the actual value and of the calculated value of the thermal power exchanged (or of the temperature difference). In practice, the actual value and the calculated value are compared, and the process concludes that there is a malfunctioning condition if the actual value deviates from the calculated value by more than a predetermined threshold. In other words, an excessive difference between actual value and calculated value is considered to be due to a malfunction.

In accordance with a second alternative, the procedure for identifying a malfunctioning condition provides for:
measuring at least one actual value of the carrier fluid flow rate traversing a thermal exchange unit,
calculating on the basis of said at least one actual value of the carrier fluid flow rate, at least one corresponding calculated value of the temperature difference or of the thermal power exchanged by the carrier fluid in the passage through the thermal exchange unit this calculated value is obtained by using a characteristic function determined at a predetermined time instant, in particular using the characteristic function determined to be the most recent,
determining the presence of a malfunctioning condition of the exchanger on the basis of the comparison between:
i. the calculated value of the temperature difference or of the thermal power exchanged by using said relative characteristic function at the predetermined time instant, and
ii. a further calculated value of the temperature difference or of the thermal power exchanged by using said actual value of the carrier fluid flow rate and a characteristic function determined at a time instant prior to that predetermined.

In other words, in this second alternative, calculated values of the parameter under examination are compared (temperature difference or thermal power exchanged), determined on the basis of characteristic curves in turn calculated in different times so as to compare relative values at different moments of the lifetime of the thermal exchange unit, without having to make any measurement apart from determining the flow rate (if not already known).

Once the (actual or calculated) values relative to a recent or current instant are compared with the calculated values relative to a preceding instant (using one of the described alternatives), the procedure provides for establishing that there is a malfunctioning condition if, following said comparison, one obtains between the values that are the object of comparison a discrepancy greater than predetermined threshold.

The process then also provides for the possibility of carrying out a step of classification of the malfunctioning type detected at a predetermined test instant, as follows.

In the first alternative, the malfunctioning is classified as caused by progressive deterioration if the discrepancy in the values of the parameters (temperature difference or exchanged power) measured at the present instant and calculated by using characteristic functions relative to an instant prior to the present instant, normalized relative to the time interval between the present instant and the preceding instant, is lower than a limit value.

The malfunctioning is instead classified as due to improper use or damage of the terminal if said discrepancy, normalized relative to the time interval between the present instant of measurement of the abovementioned parameters and the preceding instant, is greater than the limit value.

In the second alternative, the malfunctioning is classified as caused by progressive deterioration if the discrepancy in the values of the parameters (temperature difference or exchanged power) calculated by using a characteristic function at a predetermined instant and a characteristic function at an instant prior to the predetermined instant, normalized relative to the duration of the time interval between the predetermined instant and that preceding instant is lower than a limit value. The malfunctioning is instead classified as due to improper use or damage of the terminal if said discrepancy, normalized relative to the duration of the time interval between said predetermined instant and said preceding instant, is greater than the limit value.

In other words, if the discrepancy as above-determined is lower than the predetermined threshold, there is no malfunctioning; if the discrepancy is comprised between the predetermined threshold and the limit value (which is higher, for example double the predetermined threshold) there is a malfunctioning due to progressive deterioration; while if the discrepancy exceeds the limit value, then there is a malfunctioning due to damage (for example losses of carrier fluid) or due to improper use of the unit 7.

Monitoring and/or Control Device

A further aspect of the invention regards a device for monitoring and/or controlling the above-described air conditioning and/or heating plant 1; the device comprises in particular, for each service line, the flow rate regulator 8, at least one first thermal sensor 9a configured for detecting the temperature of the carrier fluid at the first section 5a of the service line 5 and a second thermal sensor 9b for detecting the temperature of the carrier fluid at the second section 5b of the same service line 5, at least the hydraulic sensor 10 configured for determining the flow rate $\varphi$ of carrier fluid. The device may also comprise the control unit 24 or 24a, 24b which is at least communicatively connected with the flow rate regulator 8, the first and the second thermal sensor 9 and with the hydraulic sensor 10, so as to collect the signals from the sensors and so as to control the flow rate regulator 8 in a manner such to regulate the carrier fluid flow rate traversing the service line. In practice, the above-described monitoring and/or controlling process is executed by the control unit 24, or 24a, 24b which may be on board each flow rate regulator or remotely located, as already illustrated. In other words, the control unit is configured for executing one or more of the processes described above or according to the above-listed aspects or according to any one of the claims enclosed herein.

The plant 1 typically comprises a number of similar or identical control devices for each one of the service lines 5 or a single control device that controls all the service lines according to the abovementioned processes or a plurality of control devices, each dedicated to a subgroup of service lines.

Control Units 24, 24a, 24b

The plant, the device and the process described and claimed herein use, as indicated above, at least one control unit set to:
receive the signals coming from the various sensors and monitor the processes described or claimed herein and of the plant/device described or claimed herein, and/or control the same plant/device described or claimed herein.

The control unit 24 can be a single unit (centralized or not, as already stated above) or be formed by a plurality of separate control units depending on the design selections and on the operating requirements.

With the term control unit it is in any case intended a component of electronic type which can comprise at least one of the following: a digital processor (CPU), a circuit of analog type, or a combination of one or more digital processors with one or more circuits of analog type. The control unit can be 'configured' or "programmed" for executing several steps: this may be achieved in practice with any means that allow configuring or programming the control unit. For example, in case of a control unit comprising one or more CPUs and one or more memories, one or more programs can be stored in suitable memory banks connected to the CPU or CPUs; the program or programs (software or firmware for example) contain instructions which, when executed by the CPU or by the CPUs, program or configure the control unit to execute the operations described in relation to the control unit itself. Such programs may be written in any programming language of known type. The CPUs, if two or more in number, may be connected to each other by means of a data connection such that their computing powers are shared in any manner; the CPUs themselves may be installed in positions that are even geographically different, achieving a distributed computing environment by means of the aforesaid data connection. The CPU(s) may be a processor of general purpose type configured for executing one or more parts of the process or of the steps described or claimed herein, the software program or firmware, or be an ASIC or dedicated processor or a FPGA, specifically programmed for executing at least part of the operations described herein. The memory support may be non-transient and internal or external with respect to the CPU(s) and may specifically be a memory geographically situated remotely with respect to the computer. The memory support may also be physically divided into multiple portions, or in "cloud" form, and the software program or firmware may provide for portions stored on memory portions that are geographically separated from each other.

As an alternative, if the control unit is, or comprises, circuitry of analog type, then the circuit of the control unit may be designed for including circuitry configured, during use, for processing electrical signals in a manner such to execute the steps relative to the control unit that is described or claimed herein.

The invention claimed is:

1. A process of controlling a plant for air conditioning or heating, said plant comprising a delivery line, a return line and a predetermined number of service lines hydraulically interposed between the delivery line and the return line, each service line comprising a thermal exchange unit,
wherein said process comprises:
circulating a carrier fluid through at least one service line of the service lines so that a carrier fluid particle traversing a first section of the service line upstream of the thermal exchange unit subsequently traverses a second section of the service line placed downstream of the thermal exchange unit, with a hydraulic delay (dt) given by a time necessary for the carrier fluid particle to pass from the first to the second section, repeating a cycle comprising:
a) determining at least one value of a temperature difference ($\Delta T$) between:
a temperature ($T_{t1}$) of the carrier fluid, at the first section, detected at a first instant (t1), and
a temperature ($T_{t2}$) of the carrier fluid, at the second section, detected at a second instant (t2), wherein the second instant is subsequent to the first instant (t1) by said hydraulic delay (dt), and
b) detecting a value ($\varphi$) of the flow rate of the carrier fluid traversing the thermal exchange unit,
wherein, in each repetition of the cycle, the process includes obtaining at least one pair of values, comprising the value of said temperature difference ($\Delta T$) and the value of the carrier fluid flow rate ($\varphi$); and the process further comprises:
using a plurality of said pairs of said values obtained from the repetition of the cycle, determining at least one of:
a characteristic function which relates said temperature difference ($\Delta T$) between the first and the second section to said value of the carrier fluid flow rate ($\varphi$), and
a characteristic function which relates a thermal power exchanged (dQ/dt) by the thermal exchange unit to said value of the carrier fluid flow rate ($\varphi$);
receiving at least one desired value of an operating parameter, the operating parameter comprising at least one of:
thermal power exchanged by the carrier fluid in the passage through each thermal exchange unit,
heat exchanged by the carrier fluid in a predetermined time interval in the passage through each thermal exchange unit, or
a temperature difference ($\Delta T$) between temperature ($T_{t1}$) of the carrier fluid, at the first section, detected at a first instant (t1), and temperature ($T_{t2}$) of the carrier fluid, at the second section, detected at a second instant (t2);
determining, for each thermal exchange unit, an actual value of said operating parameter;
comparing said desired value of the operating parameter with said actual value of the operating parameter and determining if said actual value differs from the desired value by more than a predetermined threshold; and
in response to the determination that the difference is more than the predetermined threshold, performing a control step including at least one of:
driving a central thermal treatment group connected to the delivery line to regulate at least one general parameter selected from among: flow rate set for the carrier fluid, hydraulic head set for the carrier fluid traversing the central thermal treatment group, heating set for the carrier fluid traversing the central thermal treatment group, cooling set for the carrier fluid traversing the central group,
driving the flow rate regulator present on the service line of the thermal exchange unit, or
driving a thermal exchange modulator associated with the thermal exchange unit.

2. The process according to claim 1, wherein the process includes determining said hydraulic delay (dt) by:
determining or receiving a value of a control volume (V0), which is a value representative of the volume of carrier fluid contained between said first and said second section, and
calculating the hydraulic delay as the time interval starting from the first instant (t1) and necessary so that a carrier fluid volume equal to the control volume (V0) traverses the first section; or
wherein the process provides for determining the second instant (t2), by:
determining or receiving a value of a control volume (V0), which is a value representative of the volume of carrier fluid contained between said first and said second section, and
determining the second instant (t2) as the instant at which, a carrier fluid volume equal to the control volume (V0) has traversed the first section, with measure of carrier fluid volume traversing the first cross section starting from the first instant (t1).

3. The process according to claim 2, wherein the process provides for determining said hydraulic delay (dt) at each cycle or wherein the process provides for determining the second instant (t2) at each cycle;
  wherein the value of the control volume (V0) is a set known value; or
  wherein the value of the control volume (V0) is a measured value and wherein determining the control volume (V0) measured value in turn comprises:
    measuring a temperature of the carrier fluid at the first section and at the second section,
    varying the temperature of the carrier fluid entering said service line,
    identifying an initial instant (ts) in which the temperature of the carrier fluid at the first section varies, optionally beyond a predetermined threshold,
    identifying a final instant (tf) in which the temperature of the carrier fluid at the second section varies, optionally beyond a predetermined threshold,
    measuring values of the carrier fluid flow rate ($\varphi$(t)) during an interval comprised between said initial instant and said final instant,
    calculating the control volume (V0) on the basis of the values assumed by the carrier fluid flow rate in the interval between said initial instant and said final instant.

4. The process according to claim 3, wherein calculating the control volume (V0) based on the values assumed by the carrier fluid flow rate in the interval between said initial instant and said final instant provides for using the following formula:

$\int_{ts}^{tf}(\varphi(t))dt=V0$ wherein:
  $\varphi$(t) represents the value of the carrier fluid flow rate over time,
  ts is the initial instant, and
  tf is the final instant.

5. The process according to claim 1, wherein the value of the carrier fluid flow rate ($\varphi$) traversing the thermal exchange unit is one of:
  the carrier fluid flow rate ($\varphi$) detected at the first instant (t1),
  the carrier fluid flow rate ($\varphi$) detected at the second instant (t2),
  the carrier fluid flow rate ($\varphi$) detected at an intermediate instant (tm) between the first and the second instant (t1 and t2), in particular placed at the midpoint of the time interval between the first instant (t1) and the second instant (t2), and
  an average value taken by the carrier fluid flow rate (@) during the time interval between the first instant (t1) and the second instant (t2), in particular calculated as:

$\int_{t1}^{t2}(\varphi(t))dt/(t2-t1)$ or as:

$(V0)/(t2-t1)$ with V0 being a/the control volume equal to the volume of carrier fluid contained between said first and said second section.

6. The process according to claim 1, further comprising determining, by interpolating the values of the temperature difference and of the carrier fluid flow rate of said plurality of pairs of values, the characteristic function which relates the temperature difference ($\Delta$T) between the first and the second section to the value of the carrier fluid flow rate ($\varphi$).

7. The process according to claim 1, wherein said cycle comprises:
  determining the thermal power exchanged (dQ/dt) by the thermal exchange unit, on the basis of said value of the carrier fluid flow rate ($\varphi$) traversing the thermal exchange unit and of said temperature difference ($\Delta$T), in each cycle obtaining a triad of values comprising:
  the value of said temperature difference ($\Delta$T) between the temperature ($T_{t1}$) measured at the first instant (t1) and the temperature ($T_{t2}$) measured at the second instant (t2),
  the value of said carrier fluid flow rate ($\varphi$), and
  the corresponding value of said thermal power exchanged (dQ/dt) by the thermal exchange unit; and
  the process further comprises determining the characteristic function of the thermal exchange unit present in said service line, which relates the exchanged thermal power (dQ/dt) with said value of the carrier fluid flow rate ($\varphi$), said characteristic function of the thermal exchange unit being determined by using a plurality of said triads of values obtained with respective cycles;
  wherein the step of determining the characteristic function of the exchanger is executed by using a plurality of values of the exchanged thermal power (dQ/dt) and of the carrier fluid flow rate ($\varphi$) obtained with the respective cycles.

8. The process according to claim 1, wherein the characteristic function of the thermal exchange unit present in said service line, which relates the exchanged thermal power with the value of the carrier fluid flow rate, is an exponential curve of type:

$$\frac{dQ}{dt} = A * \left(1 - e^{-\left(\frac{\varphi}{\varphi 0}\right)}\right)$$

wherein:
  dQ/dt represents the thermal power exchanged by the specific thermal exchange unit,
  $\varphi$ is the flow rate of the carrier fluid entering the thermal exchange unit,
  A and $\varphi$0 are obtained with at least one of curve fitting techniques or interpolation by approximating the pairs of values of the carrier fluid flow rate ($\varphi$) and of the thermal power (dQ/dt) obtained with each cycle;
wherein either said exponential curve is:

$$\frac{dQ}{dt} = \left[a_1 \cdot |T_{t1} - T_{air,t1}|^n + a_2 \cdot \left(1 - \text{Min}\left(1, \frac{T_{air,t1} - T_{db,air,t1}}{T_{air,t1} - T_{t1}}\right)\right)^n\right] \cdot (1 - e^{-(\varphi/\varphi 0)})$$

wherein:

$$A = \left[a_1 \cdot |T_{t1} - T_{air,t1}|^n + a_2 \cdot \left(1 - \text{Min}\left(1, \frac{T_{air,t1} - T_{db,air,t1}}{T_{air,t1} - T_{t1}}\right)\right)^n\right]$$

wherein:
  dQ/dt represents the thermal power exchanged by the specific thermal exchange unit,
  $\varphi$ is the flow rate of the carrier fluid entering the thermal exchange unit, $T_{t1}$ is a temperature of the carrier fluid entering the thermal exchange unit, i.e. at the first section at the instant t1;

$T_{air,t1}$ is a temperature of the air present in the environment where the thermal exchange unit operates or of the air entering the thermal exchange unit at the instant t1;

$T_{ab,air,t1}$ is dewpoint temperature of the air present in the environment where the thermal exchange unit operates at the instant t1 or of the air entering the thermal exchange unit; the dewpoint temperature is determined with known formulas as a function of the temperature and relative humidity of the air present at the instant t1 in the environment where the thermal exchange unit operates or of the air entering the thermal exchange unit ($T_{air,t1}$, $RH_{air,t1}$), and wherein:

a1, a2, n and φ0 are coefficients obtained with at least one of curve fitting techniques or interpolation by approximating the pairs of values of the carrier fluid flow rate (φ) and of the thermal power (dQ/dt) obtained with each cycle; or wherein said exponential curve is:

$$\frac{dQ}{dt} = [a_1 \cdot |T_{t1} - T_{air,t1}|^n] \cdot (1 - e^{-(\varphi/\varphi 0)})$$

wherein:

$$A = [a_1 \cdot |T_{t1} - T_{air,t1}|^n]$$

and wherein:

dQ/dt represents the thermal power exchanged by the specific thermal exchange unit, φ is the flow rate of the carrier fluid entering the thermal exchange unit, $T_{t1}$ Temperature is a temperature of the carrier fluid entering the thermal exchange unit at the first section at the instant t1; and $T_{air,t1}$ is a temperature of the air present in the environment where the thermal exchange unit operates or of the air entering the thermal exchange unit at the instant t1;

further wherein:

$a_1$, n and $\varphi_0$ are coefficients obtained with at least one of curve fitting techniques or interpolation by approximating the pairs of values of the carrier fluid flow rate (φ) and of the thermal power (dQ/dt) obtained with each cycle.

9. The process according to claim 8, wherein the process comprises determining an optimal operating range of the thermal exchange unit by using the coefficient $\varphi_0$ of the exponential curve; wherein the process comprises determining an optimal operating range of the thermal exchange unit by using the coefficient Do and requiring that:

the value of the carrier fluid flow rate does not exceed K $\varphi_0$, where K is a multiplicative factor >1, and the value of the carrier fluid flow rate does not fall below K' $\varphi_0$, where K' is a multiplicative factor ≤K.

10. The process according to claim 1, wherein said cycle provides for a substep for verifying stability of the flow rate of the carrier fluid; and wherein the process provides for not using, for the step of determining the characteristic function or functions, the values of temperature difference (ΔT) and of carrier fluid flow rate (φ) obtained in cycles where the stability verification did not have a positive outcome;

wherein said substep of stability verification comprises determining a reference flow rate ($\varphi_r$), comparing the carrier fluid flow rate (φ) measured at the first instant (t1) or at the second instant (t2) or at the intermediate instant (tm) with the reference flow rate ($\varphi_r$), and establishing that the stability verification has a positive outcome if the difference between the reference flow rate ($\varphi_r$) and the carrier fluid flow rate (φ) measured at the first instant (t1) or at the second instant (t2) or at the intermediate instant (tm) is less than a predetermined threshold.

11. The process according to claim 1, wherein each service line comprises:

at least one flow rate regulator configured for controlling the flow rate of the carrier fluid traversing the thermal exchange unit, at least one first thermal sensor configured for detecting the temperature of the carrier fluid at the first section of the service line and a second thermal sensor for detecting the temperature of the carrier fluid at the second section of the same-service line, and at least one hydraulic sensor configured for determining the flow rate (φ) of carrier fluid.

12. The process according to claim 1, further comprising determining said characteristic function of the thermal exchange unit a plurality of times at time intervals spaced from each other, in order to consequently collect a plurality of characteristic curves over time.

13. The process according to claim 1, further comprising:

identifying a malfunctioning condition executed at predetermined test instant by:

measuring at least one actual value of the carrier fluid flow rate traversing such thermal exchange unit, calculating on the basis of said at least one actual value of the carrier fluid flow rate, at least one corresponding calculated value of the temperature difference or of the thermal power exchanged by the carrier fluid in the flow through the thermal exchange unit, said calculated value being obtained by using a characteristic function determined at a predetermined time instant, determining the presence of a malfunctioning condition of the exchanger on the basis of the comparison between:

the calculated value of the temperature difference or of the exchanged thermal power obtained by using said relative characteristic function at the predetermined time instant, and a further calculated value of the temperature difference or of the exchanged thermal power obtained by using said actual value of the carrier fluid flow rate and a characteristic function determined at a time instant preceding that predetermined;

or identifying a malfunctioning condition executed at predetermined test instants by:

measuring at least one actual value of the carrier fluid flow rate traversing such thermal exchange unit, determining at least one corresponding actual value of said temperature difference of the carrier fluid or of thermal power exchanged by the carrier fluid, in the flow of the carrier fluid itself through the thermal exchange unit at said actual value of carrier fluid, calculating on the basis of said at least one actual value of the carrier fluid flow rate, at least one corresponding calculated value of the temperature difference or of the thermal power exchanged by the carrier fluid in the passage through the thermal exchange unit, said calculated value being obtained by using a characteristic function determined at a predetermined time instant, in particular preceding that for measuring the actual value of the carrier fluid flow rate, and determining the presence of a malfunctioning condition of the exchanger on the basis of the comparison between:

the calculated value of the temperature difference or of the exchanged thermal power by using said relative characteristic function at the predetermined time instant, and the actual value of the temperature difference or of the exchanged thermal power;

wherein the determining the presence of the malfunctioning condition comprises establishing that there is a malfunctioning condition if, following said comparison, one obtains between the values that are the object of the comparison a discrepancy greater than a predetermined threshold.

14. The process of claim 1, wherein the performing the control step comprises said step of driving the central thermal treatment group and wherein the central thermal treatment group comprises a pump and at least one of a cooling unit and a heating unit.

15. The process according to claim 13 further comprising classifying a malfunctioning type detected as:

malfunctioning caused by progressive deterioration if said discrepancy, in relation to the time interval between said predetermined instant and said preceding instant, or in relation to the time interval between the instant of measurement of the actual value of the carrier fluid flow rate and said predetermined instant is lower than a limit value, malfunctioning due to improper use or damage of the terminal if said discrepancy, in relation to the time interval between said predetermined instant and said preceding instant, or in relation to the time interval between the instant of measurement of the actual value of the carrier fluid flow rate and said predetermined instant, is greater than said limit value.

16. A process of controlling a plant for air conditioning or heating comprising a delivery line, a return line and a predetermined number of service lines hydraulically interposed between the delivery line and the return line, each of the service lines comprising a thermal exchange unit, wherein said process comprises:

circulating a carrier fluid through at least one service line, repeating, a plurality of times, a cycle in turn comprising:

a) determining at least one value of the temperature difference ($\Delta T$) between:

the temperature ($T_{t1}$) of the carrier fluid, at a first section of the service line upstream of the thermal exchange unit, and the temperature ($T_{t2}$) of the carrier fluid, at the second section of the same service line subsequently placed downstream of the thermal exchange unit, b) detecting the value ($\varphi$) of the carrier fluid flow rate traversing the thermal exchange unit, c) determining the thermal power exchanged (dQ/dt) by the thermal exchange unit, on the basis of the value of the carrier fluid flow rate ($\varphi$) traversing the thermal exchange unit and of the temperature difference ($\Delta T$);

determining a characteristic function of the thermal exchange unit present in said service line which relates a thermal power exchanged (dQ/dt) by the thermal exchange unit to the value of the carrier fluid flow rate ($\varphi$), said characteristic function of the thermal exchange unit being determined by using a plurality of values of exchanged thermal power and of carrier fluid flow rate obtained with respective cycles, wherein the characteristic function of the thermal exchange unit present in said service line, which relates the exchanged thermal power with the value of the carrier fluid flow rate, is an exponential curve of the type:

$$\frac{dQ}{dt} = A*\left(1 - e^{-\left(\frac{\varphi}{\varphi 0}\right)}\right)$$

wherein:

dQ/dt represents the thermal power exchanged by the specific thermal exchange unit, $\varphi$ is the flow rate of the carrier fluid entering the thermal exchange unit, wherein A and $\varphi_0$ are coefficients obtained with at least one of curve fitting techniques or interpolation by approximating the pairs of values of flow rate of the carrier fluid ($\varphi_{rm}$) and of the thermal power (dQ/dt) obtained with each cycle;

determining an optimal operating range of the thermal exchange unit by using the coefficient $\varphi_0$; and driving a flow rate regulator in said service line to maintain the flow rate of the carrier fluid traversing the thermal exchange unit within the optimal operating range.

17. The process according to the claim 16, wherein said exponential curve is:

$$\frac{dQ}{dt} = \left[a_1 \cdot |T_{t1} - T_{air,t1}|^n + a_2 \cdot \left(1 - \text{Min}\left(1, \frac{T_{air,t1} - T_{db,air,t1}}{T_{air,t1} - T_{t1}}\right)\right)^n\right] \cdot (1 - e^{-(\varphi/\varphi 0)})$$

wherein:

$$A = \left[a_1 \cdot |T_{t1} - T_{air,t1}|^n + a_2 \cdot \left(1 - \text{Min}\left(1, \frac{T_{air,t1} - T_{db,air,t1}}{T_{air,t1} - T_{t1}}\right)\right)^n\right]$$

wherein:

dQ/dt represents the thermal power exchanged by the specific thermal exchange unit, $\varphi$ is the flow rate of the carrier fluid entering the thermal exchange unit, $T_{t1}$ is a temperature of the carrier fluid entering the thermal exchange unit, i.e. at the first section at the instant t1;

$T_{air,t1}$ is a temperature of the air present in the environment where the thermal exchange unit operates or of the air entering the thermal exchange unit at the instant t1; and $T_{db,air,t1}$ is a dewpoint temperature of the air present in the environment where the thermal exchange unit operates at the instant t1 or of the air entering the thermal exchange unit; the dewpoint temperature is determined with known formulas as a function of the temperature and relative humidity of the air present at the instant t1 in the environment where the thermal exchange unit operates or of the air entering the thermal exchange unit ($T_{air,t1}$, $RH_{air,t1}$), wherein a1, a2, n and $\varphi_0$ are coefficients obtained with at least one of curve fitting techniques or interpolation by approximating the pairs of values of flow rate of the carrier fluid ($\varphi$) and of the thermal power (dQ/dt) obtained with each cycle; or wherein said exponential curve is:

$$\frac{dQ}{dt} = [a_1 \cdot |T_{t1} - T_{air,t1}|^n] \cdot (1 - e^{-(\varphi/\varphi 0)})$$

wherein:

$$A = [a_1 \cdot |T_{t1} - T_{air,t1}|^n]$$

and wherein:
dQ/dt represents the thermal power [KW] exchanged by the specific thermal exchange unit,
$\varphi$ is the flow rate of the carrier fluid [kg/h] entering the thermal exchange unit,
$T_{t1}$ is a temperature of the carrier fluid entering the thermal exchange unit, i.e. at the first section at the instant t1; and
$T_{air,t1}$ is a temperature of the air present in the environment where the thermal exchange unit operates or of the air entering the thermal exchange unit at the instant t1;

wherein a1, n and $\varphi 0$ are coefficients obtained with at least one of curve fitting techniques or interpolation by approximating the pairs of values of flow rate of the carrier fluid ($\varphi$) and of the thermal power (dQ/dt) obtained with each cycle.

18. The process according to claim 16, wherein the process comprises determining an optimal operating range of the thermal exchange unit using the coefficient $\varphi_0$ of the exponential curve and requiring that:
the value of the carrier fluid flow rate does not exceed K $\varphi_0$, where K is a multiplicative factor >1, or
the value of the carrier fluid flow rate does not fall below K' $\varphi_0$, where K' is a multiplicative factor ≤K.

19. A process of controlling plant for air conditioning or heating, said plant comprising:
a delivery line,
a return line,
a predetermined number of service lines hydraulically interposed between the delivery line and the return line, each service line comprising a thermal exchange unit and a flow rate regulator configured for controlling the flow rate of the carrier fluid traversing the thermal exchange unit, and
a central thermal treatment group connected to the a delivery line,
wherein said process comprises:
circulating a carrier fluid through at least one of said service lines so that a carrier fluid particle traversing a first section of the service line upstream of the thermal exchange unit subsequently traverses a second section of the service line placed downstream of the thermal exchange unit, with a hydraulic delay (dt) given by a time necessary for the carrier fluid particle to pass from the first to the second section,
determining at least one value of the temperature difference (ΔT) between:

the temperature ($T_{t1}$) of the carrier fluid, at the first section, detected at a first instant (t1), and
the temperature ($T_{t2}$) of the carrier fluid, at the second section, detected at a second instant (t2), wherein the second instant is subsequent to the first instant (t1) by said hydraulic delay (dt),
driving at least one of:
the central thermal treatment group,
the flow rate regulator, and
a thermal exchange modulator associated with the thermal exchange unit,
as a function of:
the temperature difference as measured above, or of an actual value of an operating parameter in turn being a function of the above-measured temperature difference, and
a desired value of the temperature difference or of the operating parameter.

20. The process according to claim 19, wherein said cycle comprises:
detecting the value ($\varphi$) of the carrier fluid flow rate traversing the thermal exchange unit, wherein the value of the carrier fluid flow rate ($\varphi$) traversing the thermal exchange unit is one of:
the carrier fluid flow rate ($\varphi$) detected at the first instant (t1),
the carrier fluid flow rate ($\varphi$) detected at the second instant (t2),
the carrier fluid flow rate ($\varphi$) detected at an intermediate instant (tm) between the first and the second instant (t1 and t2),
the average value taken by the carrier fluid flow rate ($\varphi$) during the time interval between the first instant (t1) and the second instant (t2), in particular calculated as:

$$\int_{t1}^{t2}(\varphi(t))dt/(t2-t1)$$

or as:

$$(V0)/(t2-t1)$$

with V0 being a/the control volume equal to the volume of carrier fluid contained between said first and said second section; and
determining as actual value of the operating parameter the thermal power exchanged (dQ/dt) by the thermal exchange unit determined on the basis of said value of the carrier fluid flow rate ($\varphi$) traversing the thermal exchange unit and of said temperature difference (ΔT).

21. The process according to claim 20, wherein driving at least one between the central thermal treatment group, the flow rate regulator and the thermal exchange modulator comprises:
receiving, for each thermal exchange unit, at least one desired value of an operating parameter comprising one from among:
i. thermal power exchanged by the carrier fluid in the passage through each thermal exchange unit,
ii. heat exchanged by the carrier fluid in a predetermined time interval in the passage through each thermal exchange unit,
iii. temperature difference (ΔT) between the temperature ($T_{t1}$) measured at the first instant (t1) and the temperature ($T_{t2}$) measured at the second instant (t2),
determining, for each thermal exchange unit, an actual value of said operating parameter by using at least the value of said temperature difference (ΔT) between the temperature ($T_{t1}$) measured at the first instant (t1) and the temperature ($T_{t2}$) measured at the second instant (t2), comparing the desired value of the operating parameter with the corresponding actual value of the operating parameter, and if following said comparison step it results that, for at least one thermal exchange unit, the actual value of the operating parameter is shifted by more than a predetermined threshold from the desired value of the operating parameter, carrying out a control step on one or more of the central group, flow rate regulator and thermal exchange modulator, said control step being aimed to align or reduce a difference between the actual value and the desired value of the operating parameter;

or wherein driving at least one from between the central thermal treatment group and the flow rate regulator comprises:

receiving, for each thermal exchange unit, at least one desired value of an operating parameter comprising one from among:

iv. thermal power exchanged by the carrier fluid in the passage through each thermal exchange unit, v. heat exchanged by the carrier fluid in a predetermined time interval in the passage through each thermal exchange unit, vi. temperature difference ($\Delta T$) between the temperature ($T_{t1}$) measured at the first instant (t1) and the temperature ($T_{t2}$) measured at the second instant (t2), determining, for each thermal exchange unit, an actual value of said operating parameter by using at least the value of said temperature difference ($\Delta T$) between the temperature ($T_{t1}$) measured at the first instant (t1) and the temperature ($T_{t2}$) measured at the second instant (t2), and at least the value of said carrier fluid flow rate ($\varphi$) at the detection instant (tm), comparing the desired value of the operating parameter with the corresponding actual value of the operating parameter, and if following said comparison step it results that, for at least one thermal exchange unit, the actual value of the operating parameter is shifted by more than one predetermined threshold from the desired value of the operating parameter, carrying out a control step on one or more of the central group, flow rate regulator and thermal exchange modulator, said control step being aimed to align or reduce a difference between the actual value and the desired value of the operating parameter.

22. The process according to claim 21, wherein the control step comprises at least one between:

driving the central thermal treatment group for regulating at least one general parameter selected from among: flow rate set for the carrier fluid traversing the delivery line or the return line, hydraulic head set for the carrier fluid traversing the central group, heating set for the carrier fluid traversing the central group, cooling set for the carrier fluid traversing the central group, driving the flow rate regulator present on the service line of the thermal exchange unit, and driving the thermal exchange modulator associated with the thermal exchange unit.

\* \* \* \* \*